(12) United States Patent
Yamaguchi et al.

(10) Patent No.: US 7,098,441 B2
(45) Date of Patent: Aug. 29, 2006

(54) PHOTOELECTRIC SENSOR

(75) Inventors: Akiji Yamaguchi, Osaka (JP); Shinya Asada, Osaka (JP); Shinichi Tsukigi, Osaka (JP)

(73) Assignee: Keyence Corporation, Osaka (JP)

( * ) Notice: Subject to any disclaimer, the term of this patent is extended or adjusted under 35 U.S.C. 154(b) by 177 days.

(21) Appl. No.: 10/959,452

(22) Filed: Oct. 7, 2004

(65) Prior Publication Data
US 2005/0082465 A1 Apr. 21, 2005

(30) Foreign Application Priority Data
Oct. 7, 2003 (JP) .................. P. 2003-348429
Mar. 18, 2004 (JP) .................. P. 2004-079135

(51) Int. Cl.
*H01L 31/00* (2006.01)
(52) U.S. Cl. .................... 250/221; 250/222.1; 340/555
(58) Field of Classification Search ................ 250/221, 250/222.1, 227.11; 340/555–557; 385/11, 385/100, 101, 88, 89, 92–94, 139
See application file for complete search history.

(56) References Cited

U.S. PATENT DOCUMENTS

| | | | |
|---|---|---|---|
| 4,789,778 A | 12/1988 | Layh | |
| 5,237,171 A * | 8/1993 | Liva et al. | 250/227.11 |
| 5,270,541 A * | 12/1993 | Matuzaki | 250/239 |
| 5,281,810 A * | 1/1994 | Fooks et al. | 250/222.1 |
| 5,790,259 A * | 8/1998 | Mizuhata et al. | 356/445 |
| 5,808,296 A * | 9/1998 | McMonagle et al. | 250/221 |
| 6,094,272 A | 7/2000 | Okamoto | |
| 6,124,936 A | 9/2000 | Okamoto | |
| 6,211,784 B1 * | 4/2001 | Nishide | 340/568.1 |
| 6,323,481 B1 | 11/2001 | Ueki | |
| 6,392,214 B1 | 5/2002 | Okamoto | |
| 6,455,829 B1 * | 9/2002 | Fukumura | 250/201.5 |
| 6,717,515 B1 * | 4/2004 | Osako et al. | 340/540 |
| 6,770,864 B1 * | 8/2004 | Yan | 250/221 |
| 2002/0130822 A1 * | 9/2002 | Fukumura | 345/39 |
| 2004/0134424 A1 | 7/2004 | Dobrowolski | |

FOREIGN PATENT DOCUMENTS

| | | |
|---|---|---|
| JP | 9-229764 A | 9/1997 |
| JP | 11-330940 A | 11/1999 |
| JP | 2002-270889 A | 9/2002 |
| WO | WO 02 086515 A | 10/2002 |

* cited by examiner

*Primary Examiner*—Stephone B. Allen
*Assistant Examiner*—Davienne Monbleau
(74) *Attorney, Agent, or Firm*—Smith Patent Office

(57) ABSTRACT

Light emitted from light-projecting elements constituted by LEDs (light-emitting diodes) or the like is transmitted to a light-projecting optical system of a sensor head portion through an optical fiber cable and projected from the light-projecting optical system onto an object. The light projected onto the object is reflected on the object. The reflected light is made incident on a light-receiving optical system. The light incident on the light-receiving optical system is led to a light-receiving element. The light-receiving element detects the incident light and generates a light-receiving signal based on the quantity of the detected light. The light-receiving signal generated by the light-receiving element is transmitted to a signal processing control portion of a main body portion through a light-receiving circuit and an electric wire cable.

14 Claims, 25 Drawing Sheets

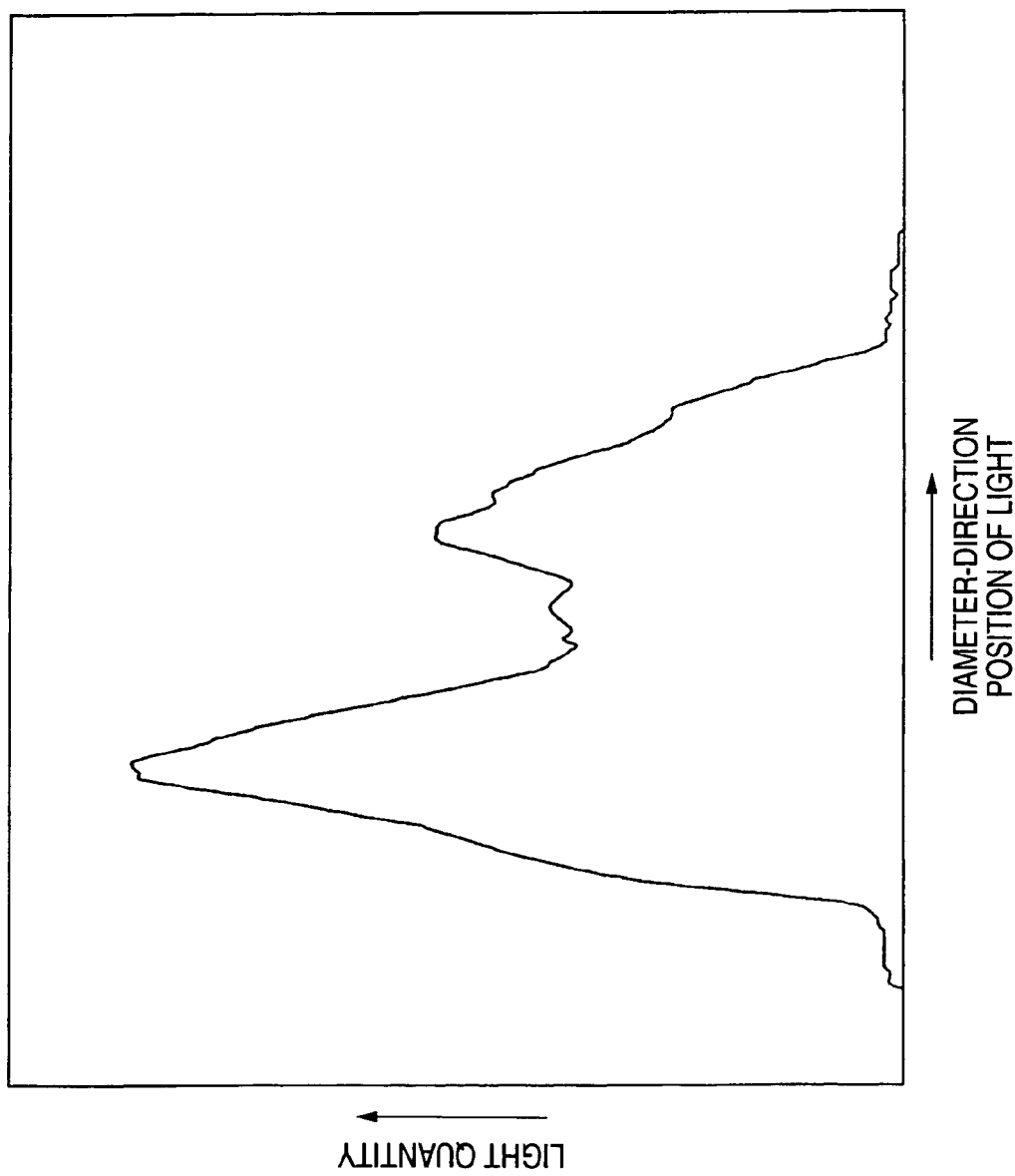

PHOTOELECTRIC SENSOR

This application claims foreign priorities based on Japanese patent application JP2003-348429, filed on Oct. 7, 2003 and Japanese patent application JP 2004-079135, filed on Mar. 18, 2004, the contents of which are incorporated herein by reference in its entirety.

BACKGROUND OF THE INVENTION

1. Field of the Invention

The present invention relates to a photoelectric sensor provided with light-projecting elements and a light-receiving element.

2. Description of the Related Art

A photoelectric sensor is used for detecting the presence of an object in a detection region, the position of the object, the color of the object, etc. by means of projecting light on the detection region and receiving the reflected or transmitted light from the object.

In a separate type photoelectric sensor, a sensor head portion for projecting light and receiving light and a main body portion for processing various signals are separated from each other.

As a related-art separate type photoelectric sensor, there is a photoelectric sensor including: a sensor head portion including a light source, and a light-receiving element; and a main body portion including various circuits. The circuits in the main body portion are connected to the light source and light-receiving element in the sensor head portion by two electric wire cables.

The light emission state of the light source of the sensor head portion is controlled from the main body portion side through one of the electric wire cables. With light emission from the light source, light reflected on an object is received by the light-receiving element of the sensor head portion. A signal output from the light-receiving element is transmitted to the main body portion through the other electric wire cable.

As another related-art photoelectric sensor, there is a photoelectric sensor including: a main body portion including a light source, and a light-receiving element; and a sensor head portion connected to the main body portion by two optical fiber cables (e.g. see Japanese Patent Laid-Open No. 330940/1999).

In the photoelectric sensor, light emitted from a light-emitting element of the main body portion is led to the sensor head portion through one of the optical fiber cables. Light reflected on an object is led from the sensor head portion to the light-receiving element of the main body portion through the other optical fiber cable.

The related-art photoelectric sensors however have the following problems.

In the photoelectric sensor in which the main body portion and the sensor head portion are connected to each other by two electric wire cables, a signal for controlling the light emission state of the light-emitting element and a signal output from the light-receiving element are transmitted by two electric wire cables adjacent to each other and having a length of about 2 m to about 10 m. For this reason, the signals propagated through the two electric wire cables interfere with each other. As a result, the level of noise increases, so that S/N (signal-to-noise ratio) deteriorates. Accordingly, detection accuracy is lowered, so that reliability is lowered.

On the other hand, in the photoelectric sensor in which the main body portion and the sensor head portion are connected to each other by two optical fiber cables, light emitted from the light-emitting element of the main body portion is transmitted to the sensor head portion through one of the optical fiber cables while light reflected on the object is led from the sensor head portion to the light-receiving element through the other optical fiber cable. For this reason, attenuation of the quantity of light caused by transmission of light becomes remarkable. When, for example, the quantity of light is attenuated to about 65% by one optical fiber cable, no more than about 42% of the quantity of light emitted from the light-emitting element can be received.

As described above, in the photoelectric sensor in which the sensor head portion and the main body portion are connected to each other by two optical fiber cables, light-utilizing efficiency is low.

SUMMARY OF THE INVENTION

An object of the invention is to provide a photoelectric sensor improved in light-utilizing efficiency and high in detection accuracy.

The invention provides a photoelectric sensor for projecting light on a detection region and receiving part of the light from the detection region, including: a main body portion including a light source for generating light, and a control portion for controlling the light source and performing signal processing; a head portion provided separately from the main body portion and including a light-projecting portion for projecting light, and a light-receiving element for receiving the light; an optical fiber cable through which light generated by the light source of the main body portion is led to the light-projecting portion of the head portion; and an electric wire cable through which a signal output from the light-receiving element of the head portion is transmitted to the control portion of the main body portion.

In the photoelectric sensor according to the invention, the light source and the control portion are provided in the main body portion while the light-projecting portion and the light-receiving element are provided in the head portion. The main body portion and the head portion are connected to each other by the optical fiber cable and the electric wire cable. Light emitted from the light source of the main body portion is led to the light-projecting portion of the head portion through the optical fiber cable. A signal output from the light-receiving element of the head portion is transmitted to the control portion of the main body portion through the electric wire cable.

Accordingly, because light from the detection region can be received by the light-receiving element of the head portion without interposition of the optical fiber cable, attenuation of light can be suppressed so that the quantity of received light can be improved.

The output signal transmitted from the light-receiving element of the head portion to the control portion of the main body portion through the electric wire cable can be prevented from interfering with a signal output from the control portion of the main body portion for controlling the light source. As a result, detection error can be prevented so that detection accuracy can be improved.

Moreover, because light emitted from the light source of the main body portion is transmitted to the light-projecting portion of the head portion through the optical fiber cable, unevenness in the quantity of light received by the light-receiving element can be suppressed.

The light source may have light-projecting elements for generating light with different wavelengths. In this case, because light with different wavelengths generated by the light-projecting elements of the main body portion is transmitted to the light-projecting portion of the head portion through the optical fiber cable, unevenness in the quantity of light with each wavelength received by the light-receiving element can be suppressed. Accordingly, color unevenness can be eliminated and color detection error can be prevented sufficiently, so that reliability can be improved.

A signal output from the control portion of the main body portion may be transmitted to the head portion through the electric wire cable; and the head portion may further include an indicator portion for indicating information based on the signal transmitted from the main body portion.

In this case, the signal output from the control portion of the main body portion is transmitted to the head portion. In the head portion, the indicator portion indicates information based on the signal transmitted from the main body portion.

Accordingly, a user can confirm the detection state or the light-receiving state by visually recognizing the indicator portion of the head portion in a place far from the main body portion. Accordingly, the head portion can be positioned easily and accurately.

The main body portion may further include a main body casing in which the light source and the control portion are stored and which has outer surfaces; and the optical fiber cable and the electric wire cable may extend out from any one of the outer surfaces of the main body casing.

In this case, because the optical fiber cable and the electric wire cable extend out from one outer surface, it is easy to extend the optical fiber cable and the electric wire cable in a predetermined direction. Accordingly, it is easy to install the main body portion.

The main body portion may further include a main body indicator portion for indicating information based on the signal processing executed by the control portion; and the main body indicator portion may be provided on another outer surface than the one outer surface of the main body casing.

In this case, because the main body indicator portion is not provided in one outer surface from which the optical fiber cable and the electric wire cable extend out, indication of information based on signal processing by the control portion can be prevented from being obstructed by the optical fiber cable and the electric wire cable. Accordingly, an operating person can view the indication of the main body indicator portion from all directions.

The main body portion may further include: a connection portion through which the electric wire cable and the control portion are connected to each other; and a first fixing member for fixing the electric wire cable to the connection portion. In this case, because the electric wire cable is fixed to the connection portion by the first fixing member, the electric wire cable and the connection portion can be connected to each other surely. Accordingly, the electric wire cable can be prevented from dropping out of the connection portion.

The main body portion may further include a second fixing member for fixing the optical fiber cable to the main body casing. In this case, because the optical fiber cable is fixed to the main body casing by the second fixing member, the optical fiber cable and the main body casing can be connected to each other surely. Accordingly, the optical fiber cable can be prevented from dropping out of the main body casing.

The head portion may further include: a first polarizing member for polarizing light projected by the light-projecting portion to allow only light polarized in a first direction to pass through the first polarizing member; and a second polarizing member for polarizing the light received by the light-receiving element to allow only light polarized in a second direction different from the first direction to pass through the second polarizing member.

In this case, polarized light vibrating in the first direction among the light projected by the light-projecting portion is projected on the detection region whereas polarized light vibrating in the second direction among the light from the detection region is received by the light-receiving element. Accordingly, light specularly reflected on the object can be reduced so that diffuse-reflected light can be received.

Incidentally, it is preferable that the first direction is perpendicular to the second direction. In this case, specular-reflected light can be removed sufficiently.

The head portion may further include a head portion casing in which the light-projecting portion and the light-receiving element are stored and which has outer surfaces; and the optical fiber cable and the electric wire cable may extend out from a first outer surface included in the outer surfaces of the head portion casing.

In this case, because the optical fiber cable and the electric wire cable extend out from the first outer surface included in the outer surfaces of the head portion casing, it is easy to extend the optical fiber cable and the electric wire cable in a predetermined direction. Accordingly, it is easy to install the head portion.

A second outer surface opposite to the first outer surface maybe included in the outer surfaces of the head portion casing; and the light-projecting portion and a light-receiving portion by which light from the detection region is led to the light-receiving element may be provided on the second outer surface of the head portion casing.

Light led from the light source by the optical fiber cable an be led from the first outer surface side to the light-projecting portion provided in the second outer surface without bending of the path of light. Accordingly, the optical system in the head portion casing can be simplified and the dimension between the first and second outer surfaces can be reduced. As a result, the size of the head portion can be reduced.

A second outer surface opposite to the first outer surface and a third outer surface different from the first and second outer surfaces may be included in the outer surfaces of the head portion casing; and the light-projecting portion and a light-receiving portion by which light from the detection region is led to the light-receiving element may be provided on the third outer surface of the head portion casing. In this case, it is possible to detect an object located in a direction crossing the direction of extension of the optical fiber cable and the electric wire cable.

Second ad third outer surfaces opposite to each other and a fourth outer surface different from the second and third outer surfaces may be included in the outer surfaces of the head portion casing; the light-projecting portion and a light-receiving portion by which light from the detection region is led to the light-receiving element may be provided on the second outer surface of the head portion casing; and the first outer surface may be provided between the third and fourth outer surfaces so as to be inclined.

Because the optical fiber cable and the electric wire cable are provided in the first outer surface which is provided between the third and fourth outer surfaces so as to be inclined, the optical fiber cable and the electric wire cable can be extended while belt in the direction of the third outer surface and in the direction of the fourth outer surface easily.

As a result, desired one of the third and fourth outer surfaces of the head portion casing can be mounted on a support surface.

A signal output from the control portion of the main body portion may be transmitted to the head portion through the electric wire cable; and the head portion may further include an indicator portion for indicating information based on the signal transmitted from the main body portion.

In this case, the signal output from the control portion of the main body portion is transmitted to the head portion. In the head portion, the indicator portion indicates information based on the signal transmitted from the main body portion.

Accordingly, a user can confirm the detection state or the light-receiving state by visually recognizing the indicator portion of the head portion in a place far from the main body portion. Accordingly, the head portion can be positioned easily and accurately.

The indicator portion may be provided on another outer surface than the first outer surface of the head portion casing. In this case, because the indicator portion is provided in another outer surface than the first outer surface in which the optical fiber cable and the electric wire cable are provided, indication based on the signal transmitted from the main body portion can be prevented from being obstructed by the optical fiber cable and the electric wire cable. Accordingly, an operating person can view the indication of the indicator portion from all directions.

In the photoelectric sensor according to the invention, the light source and the control portion are provided in the main body portion while the light-projecting portion and the light-receiving element are provided in the head portion. The main body portion and the head portion are connected to each other by the optical fiber cable and the electric wire cable. Light emitted from the light source of the main body portion is led to the light-projecting portion of the head portion through the optical fiber cable. A signal output from the light-receiving element of the head portion is transmitted to the control portion of the main body portion through the electric wire cable.

Accordingly, because light from the detection region is received by the light-receiving element of the head portion without interposition of the optical fiber cable, attenuation of light can be suppressed so that the quantity of received light can be improved.

Moreover, the output signal transmitted from the light-receiving element of the head portion to the control portion of the main body portion through the electric wire cable can be prevented from interfering with a signal output from the control portion of the main body portion for controlling the light source. As a result, detection error can be prevented, so that detection accuracy can be improved.

In addition, because light emitted from the light source of the main body portion is transmitted to the light-projecting portion of the head portion through the optical fiber cable, unevenness in the quantity of light received by the light-receiving element can be suppressed.

BRIEF DESCRIPTION OF THE DRAWINGS

FIG. 4 is a graph showing the diameter-direction light quantity distribution of light taken along the line X—X in FIG. 3;

DETAILED DESCRIPTION OF THE INVENTION

A photoelectric sensor according to embodiments of the invention will be described below with reference to FIGS. 1 through 25B.

(First Embodiment)

Figure 1:
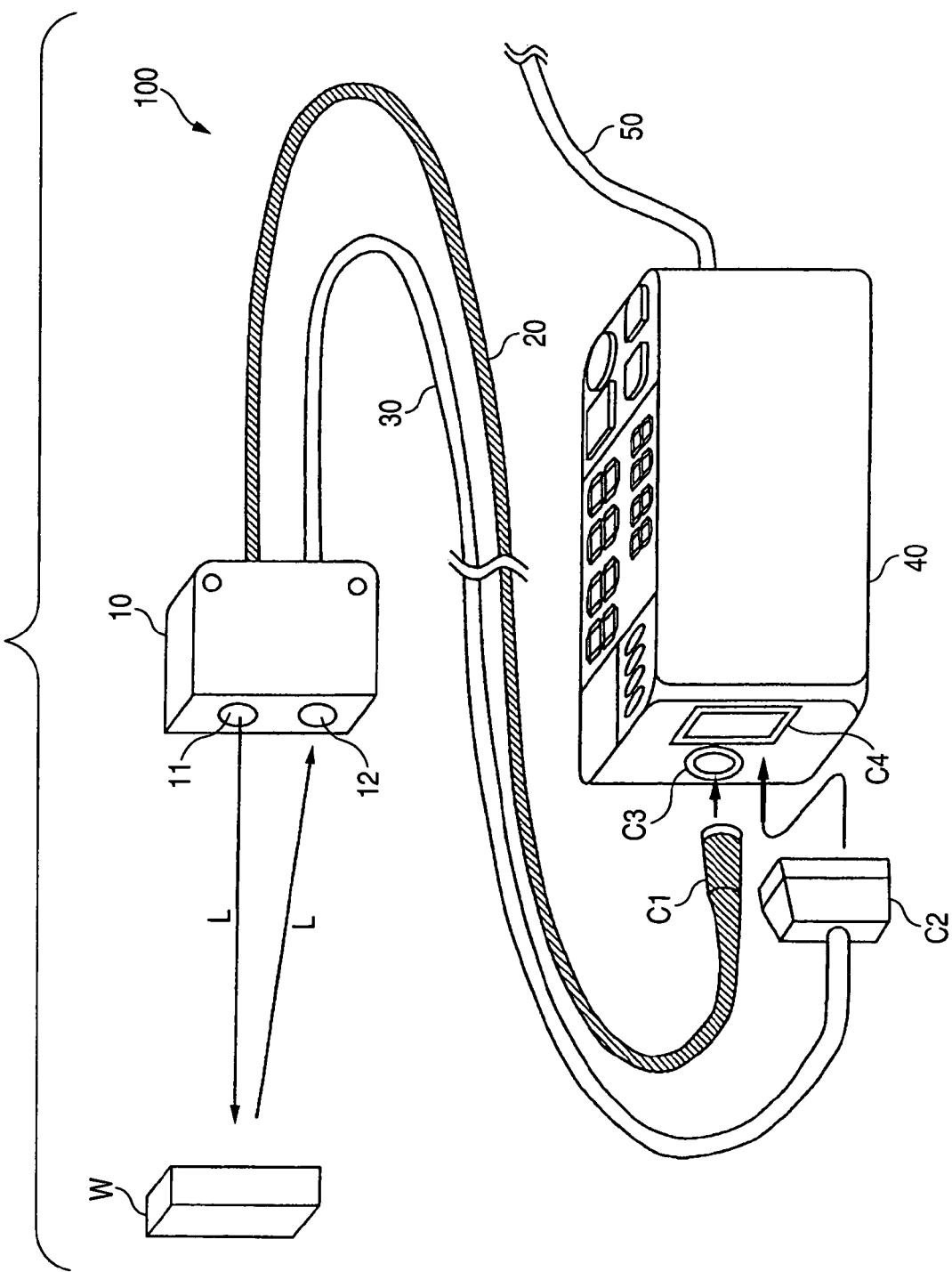
FIG. 1 is a perspective view showing the external appearance of a photoelectric sensor according to a first embodiment of the invention.

FIG. 1 is a perspective view showing the external appearance of a photoelectric sensor according to a first embodiment of the invention. The photoelectric sensor according to the first embodiment is a color discrimination sensor for discriminating the color of an object.

The photoelectric sensor 100 according to the first embodiment includes a sensor head portion 10, an optical fiber cable 20, an electric wire cable 30, a main body portion 40, and an output cable 50.

As shown in FIG. 1, a connector C1 of the optical fiber cable 20 extending from the sensor head portion 10 is connected to a connector C3 of the main body portion 40. A connector C2 of the electric wire cable 30 extending from the sensor head portion 10 is connected to a connector C4 of the main body portion 40. The output cable 50 extending from the main body portion 40 is connected to an external apparatus not shown.

A light-projecting optical system 11 and a light-receiving optical system 12 are provided in the sensor head portion 10. Light L emitted from the light-projecting optical system 11 is reflected on an object W, so that the reflected light is made incident on the light-receiving optical system 12.

Figure 2:
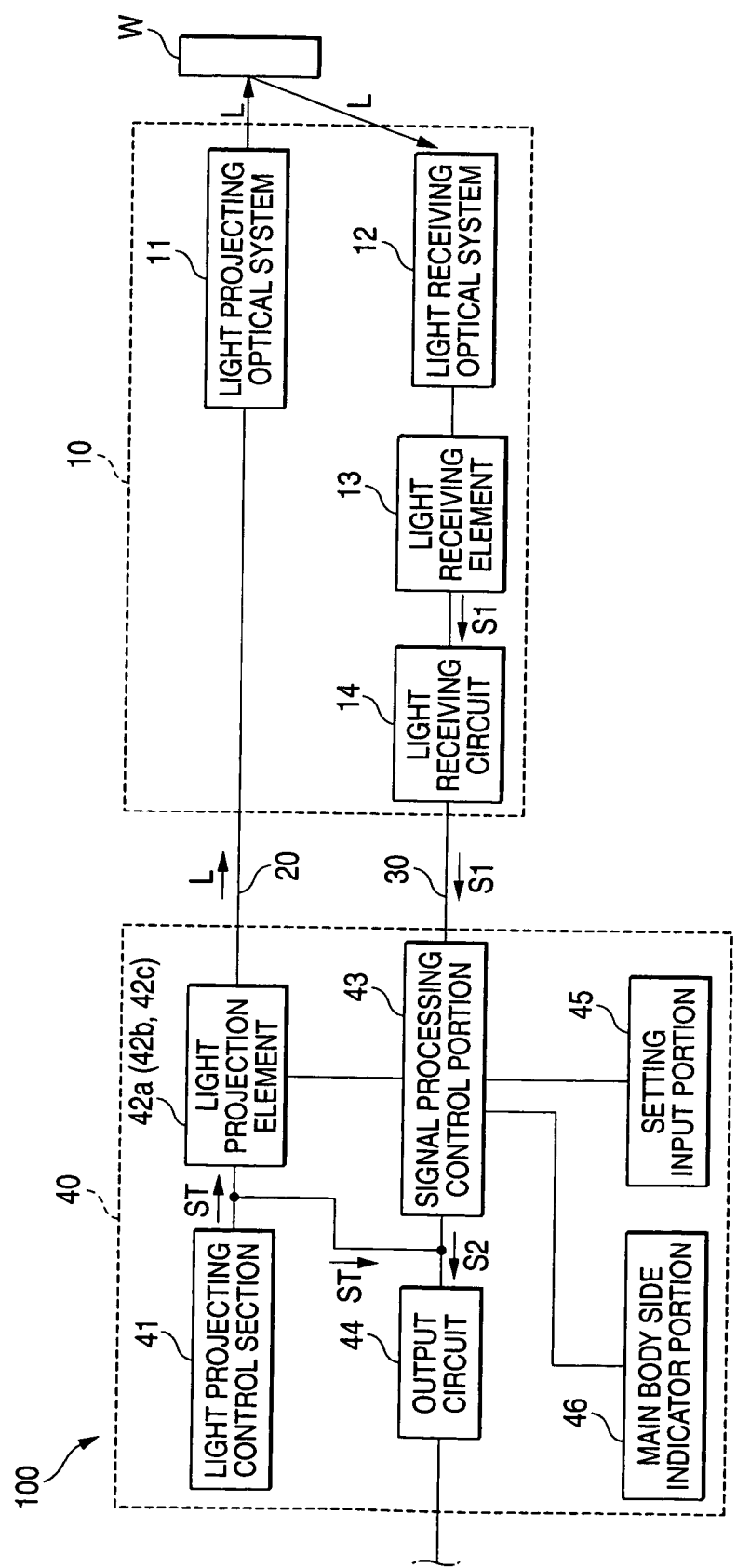
FIG. 2 is a block diagram showing the internal configuration of the photoelectric sensor according to the first embodiment.

FIG. 2 is a block diagram showing the internal configuration of the photoelectric sensor 100 according to the first embodiment.

The sensor head portion 10 of the photoelectric sensor 100 includes the light-projecting optical system 11, the light-receiving optical system 12, a light-receiving element 13, and a light-receiving circuit 14. The main body portion 40 of the photoelectric sensor 100 includes a light-projecting control portion 41, light-projecting elements 42a, 42b and 42c, a signal processing control portion 43, an output circuit 44, a setting input portion 45, and a main body side indicator portion 46.

The light-projecting control portion 41 controls the light-emitting operations of the light-projecting elements 42a, 42b and 42c. Specifically, the light-projecting control portion 41 outputs a light-projecting timing signal ST indicating light-emitting timing of the light-projecting elements 42a, 42b and 42c to the light-projecting elements 42a, 42b and 42c and the signal processing control portion 43.

For example, the light-projecting elements 42a, 42b and 42c are constituted by LEDs (light-emitting diodes) or the like. Light L emitted from the light-projecting elements 42a, 42b and 42c is led to the light-projecting optical system 11 of the sensor head portion 10 through the optical fiber cable 20. The optical fiber cable 20 includes a single optical fiber.

For example, the light-projecting optical system 11 and the light-receiving optical system 12 are constituted by lenses or the like. The light-projecting optical system 11 is configured so that light L led to the light-projecting optical system 11 through the optical fiber cable 20 is projected out. The light-receiving optical system 12 is configured so that light L projected out by the light-projecting optical system 11 and reflected on the object W is made incident on the light-receiving optical system 12.

The light L incident on the light-receiving optical system 12 is led to the light-receiving element 13. The light-receiving element 13 generates a light-receiving signal S1 corresponding to the quantity of received light.

The light-receiving circuit 14 amplifies the light-receiving signal Si generated by the light-receiving element 13 and transmits the amplified light-receiving signal S1 to the signal processing control portion 43 of the main body portion 40 through the electric wire cable 30.

The signal processing control portion 43 performs predetermined signal processing on the light-receiving signal S1 and outputs a detection signal S2 indicating detection/non-detection of the object W through the output circuit 44. Signal processing executed by the signal processing control portion 43 will be described later in detail.

The signal processing control portion 43 makes the main body side indicator portion 46 indicate predetermined information based on the input light-receiving signal S1 and a user's operation on the setting input portion 45. The operation on the setting input portion 45 and the information indicated by the main body side indicator portion 46 will be described later in detail.

As described above, in the photoelectric sensor 100 according to this embodiment, the light-projecting elements 42a, 42b and 42c are provided in the main body portion 40 while the light-receiving element 13 is provided in the sensor head portion 10. The light-projecting elements 42a, 42b and 42c of the main body portion 40 are connected to the light-projecting optical system 11 of the sensor head portion 10 by the optical fiber cable 20 while the light-receiving circuit 14 of the sensor head portion 10 is connected to the signal processing control portion 43 of the main body portion 40 by the electric wire cable 30.

Accordingly, light reflected on the object W can be received by the light-receiving element 13 without interposition of any optical fiber, so that attenuation of light can be suppressed. Specifically, the quantity of received light can be increased by about 50% compared with an existing separate type photoelectric sensor (in which a main body portion and a sensor head portion are connected to each other by two optical fiber cables).

The light-receiving signal S1 transmitted from the light-receiving circuit 14 of the sensor head portion 10 to the signal processing control portion 43 of the main body portion 40 through the electric wire cable 30 can be prevented from interfering with the light-projecting timing signal ST given from the light-projecting control portion 41 of the main body portion 40 to the light-projecting elements 42a, 42b and 42c. As a result, detection error can be prevented.

Because light L generated by the light-projecting elements 42a, 42b and 42c of the main body portion 40 passes through the optical fiber cable 20, unevenness in quantity of light L can be suppressed as will be described later.

The effect of the optical fiber cable 20 on suppressing unevenness in quantity of light L will be described here.

Figure 3:
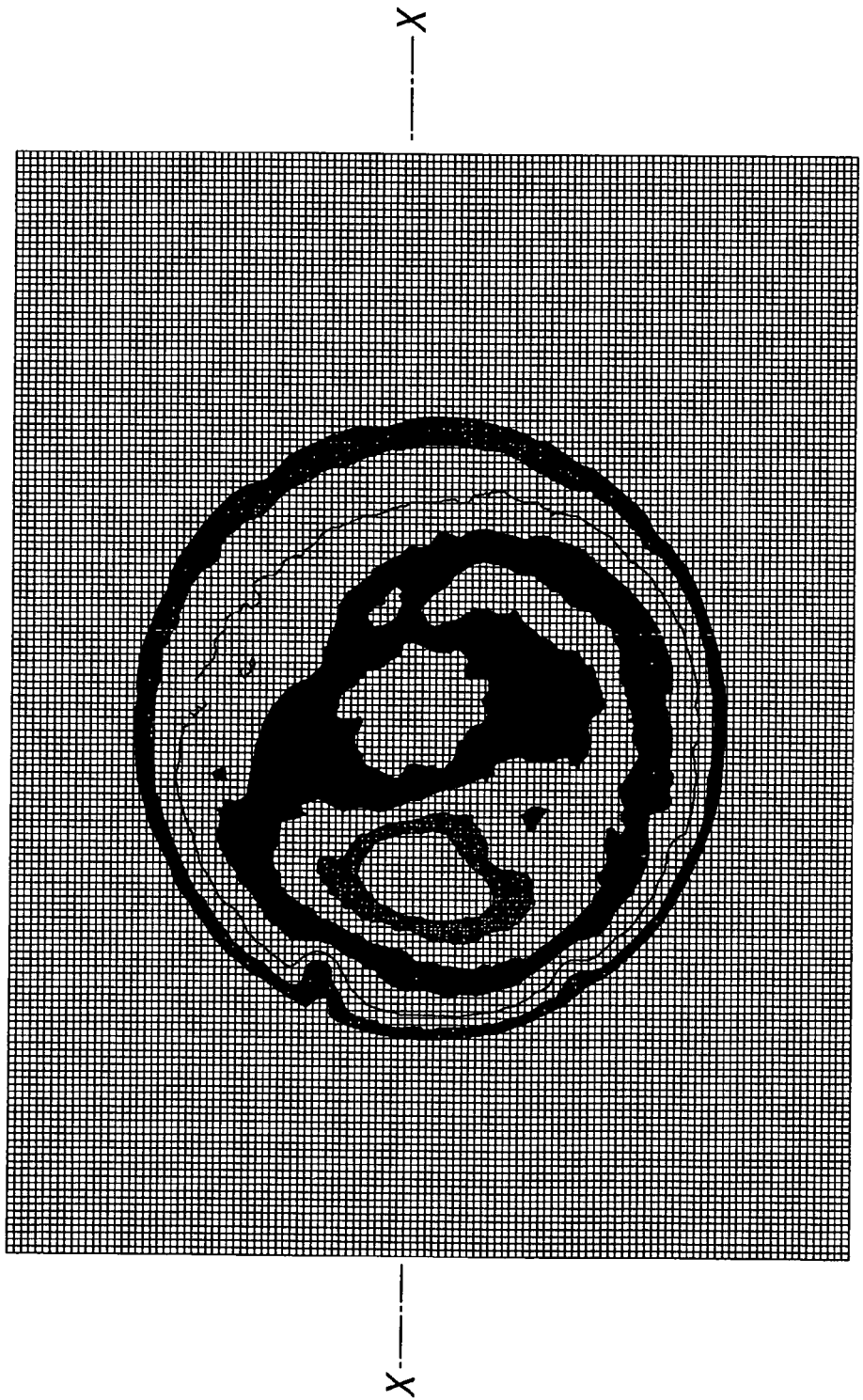
FIG. 3 is a view showing a result of measurement of the light quantity distribution of light emitted from light-projecting elements.

FIG. 3 is a view showing a result of measurement of the light quantity distribution of light emitted from the light-projecting elements 42a, 42b and 42c. FIG. 4 is a graph showing the diameter-direction light quantity distribution of light taken along the line X—X in FIG. 3.

As shown in FIGS. 3 and 4, conspicuous light quantity unevenness occurs in the light quantity distribution of light emitted from the light-projecting elements 42a, 42b and 42c. According to FIG. 4, such light quantity unevenness that the smallest value is about a half of the largest value occurs even in a neighborhood of the center of light. For example, this is caused by a shadow due to bonding wires connected to electrodes of LED chips.

Figure 5A:
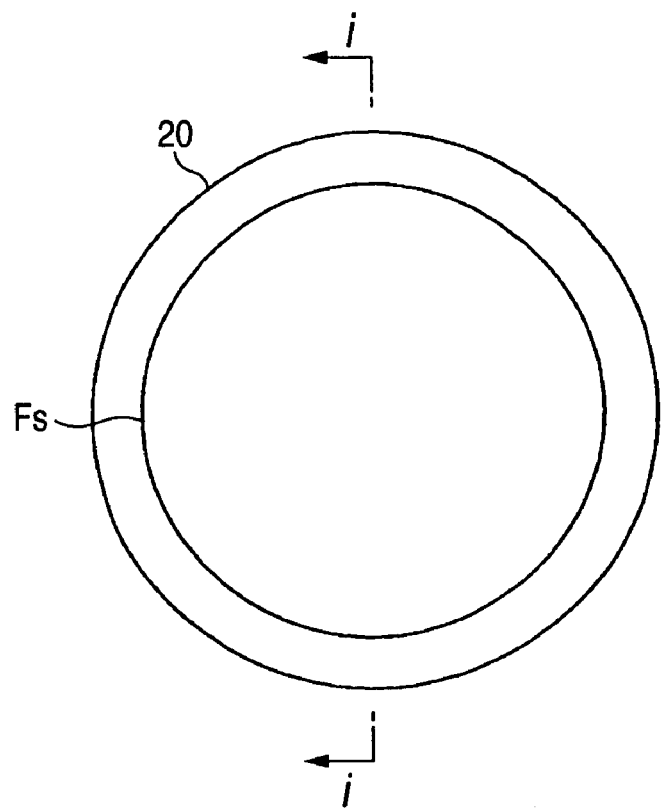
FIG. 5A is a sectional view of an optical fiber cable having a single optical fiber.
Figure 5B:
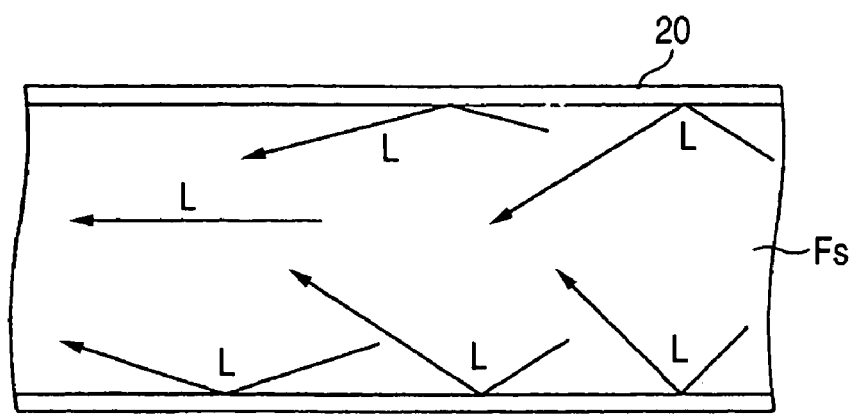
FIG. 5B is a typical view showing a state in which light passes through the optical fiber cable.

FIG. 5A is a sectional view of the optical fiber cable 20 having a single optical fiber. FIG. 5B is a typical view showing a state in which light passes through the optical fiber cable 20. That is, FIG. 5A shows a cross section of the optical fiber cable 20, and FIG. 5B shows part of a section taken along the line i—i in FIG. 5A.

In the optical fiber cable 20 shown in FIGS. 5A and 5B, light L emitted from the light-projecting elements 42a, 42b and 42c is led to the light-projecting optical system 11 of the sensor head portion 10 through a single optical fiber Fs.

In the inside of the optical fiber cable 20, light L is propagated in random directions in the single optical fiber Fs while transmitted and reflected, so the light L is led to the light-projecting optical system 11. Accordingly, the uneven quantity of light L emitted from the light-projecting elements 42a, 42b and 42c is made even (equalized) while light L passes through the optical fiber Fs.

Figure 6:
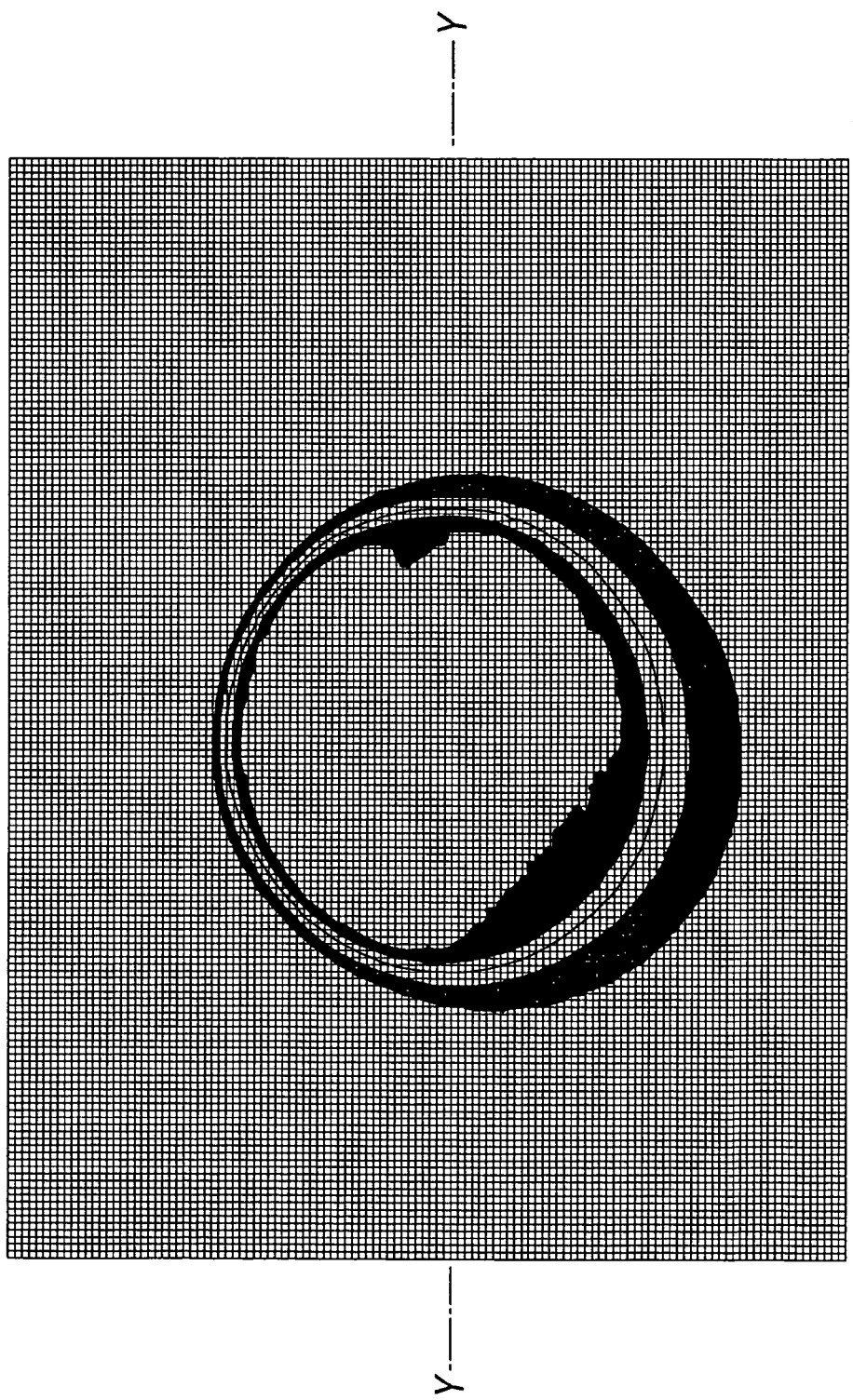
FIG. 6 is a view showing a result of measurement of the light quantity distribution of light in the case where light emitted from the light-projecting elements has passed through the optical fiber cable depicted in FIGS. 5A and 5B.
Figure 7:
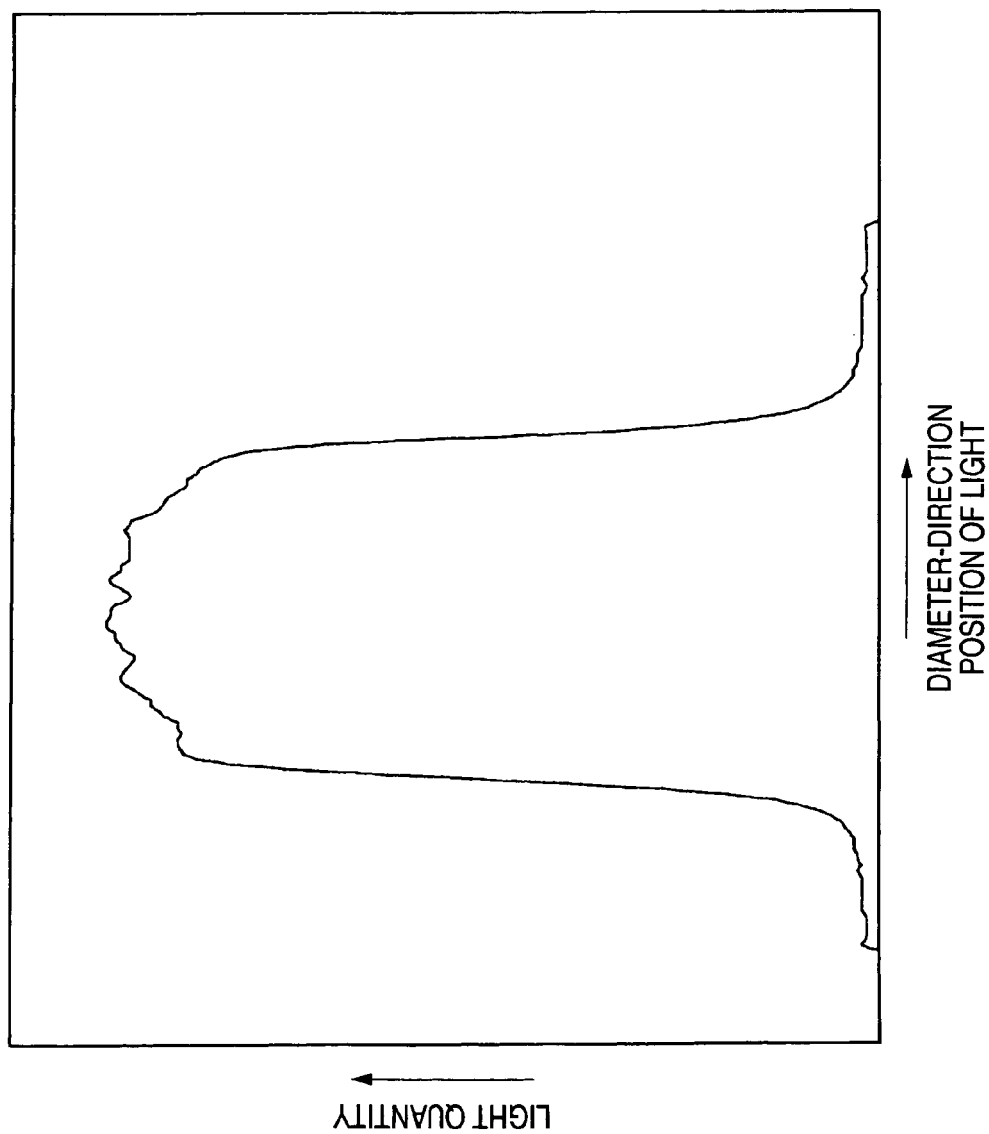
FIG. 7 is a graph showing the diameter-direction light quantity distribution of light L taken along the line Y—Y in FIG. 6.

FIG. 6 is a view showing a result of measurement of the light quantity distribution of light L in the case where light L emitted from the light-projecting elements 42a, 42b, and 42c has passed through the optical fiber cable 20 shown in FIGS. 5A and 5B. FIG. 7 is a graph showing the diameter-direction light quantity distribution of light L taken along the line Y—Y in FIG. 6.

As shown in FIGS. 6 and 7, the light quantity distribution of light which has passed through the optical fiber cable 20 shown in FIGS. 5A and 5B shows rapid leading and trailing at edges of a light spot and approximately shows stability in a neighborhood of the center of the light spot. In this manner, light quantity unevenness is suppressed remarkably compared with the light quantity distribution of light shown in FIGS. 3 and 4.

Accordingly, because light L emitted from the light-projecting elements 42a, 42b and 42c of the main body portion 40 passes through the optical fiber cable 20, the light L having light quantity unevenness suppressed is made incident on the light-receiving element 13. As a result, detection error can be prevented sufficiently from being caused by the light quantity unevenness of the light incident on the light-receiving element 13. The same thing can apply to the case where the main body portion 40 has one light-projecting element.

Figure 8:
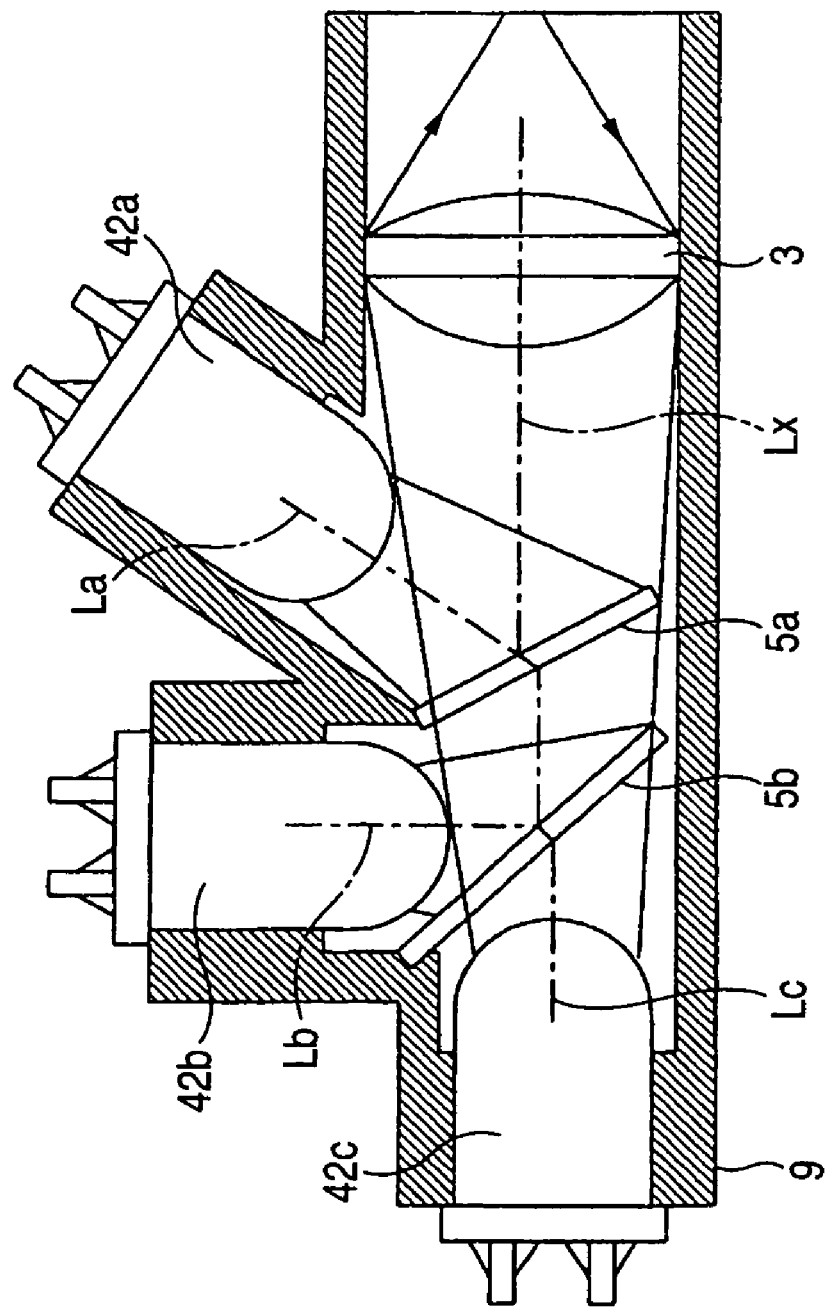
FIG. 8 is atypical sectional view showing the arrangement of light-projecting elements in the inside of a sensor head portion.

The light-projecting elements 42a, 42b and 42c provided in the inside of the sensor head portion 10 shown in FIG. 1 will be described. FIG. 8 is a typical sectional view showing the arrangement of the light-projecting elements 42a, 42b and 42c in the inside of the sensor head portion 10.

In FIG. 8, the light-projecting elements 42a, 42b and 42c, a light-projecting lens 3 and two dichroic mirrors 5a and 5b are disposed in a holder 9. The optical fiber cable 20 is attached in front of the light-projecting lens 3.

The light-projecting elements 42a, 42b and 42c are different in emission color. For example, the light-projecting element 42a emits green light, the light-projecting element 42b emits blue light, and the light-projecting element 42c emits red light.

The light-projecting element 42c is disposed so that the optical axis Lc of the light-projecting element 42c is parallel to the optical axis Lx of the light-projecting lens 3 but slightly shifted from the optical axis Lx in consideration of refraction of light due to the dichroic mirrors 5a and 5b. The light-projecting element 42b is disposed so that the optical axis Lb of the light-projecting element 42b is approximately perpendicular to the optical axis Lx of the light-projecting lens 3. The light-projecting element 42a is disposed so that the optical axis La of the light-projecting element 42a intersects the optical axis Lx of the light-projecting lens 3 at an angle (acute angle) larger than 0° but smaller than 90°. The optical axes La, Lb and Lc of the light-projecting elements 42a, 42b and 42c are arranged on one plane. Accordingly, the sensor head portion 10 per se can be made thin.

Each of the dichroic mirrors 5a and 5b reflects light with wavelengths in a specific range but transmits light with wavelengths out of the specific range. In this example, the dichroic mirror 5a reflects light with wavelengths emitted from the light-projecting element 42a but transmits light with other wavelengths. The dichroic mirror 5b reflects light with wavelengths emitted from the light-projecting element 42b but transmits light with other wavelengths.

The dichroic mirror 5b is disposed so that light emitted from the light-projecting element 42c is transmitted so as to be led to the light-projecting lens 3 while light emitted from the light-projecting element 42b is reflected so as to be led to the light-projecting lens 3. The dichroic mirror 5a is disposed so that light emitted from the light-projecting element 42c and transmitted through the dichroic mirror 5b and light emitted from the light-projecting element 42b and reflected on the dichroic mirror 5b is transmitted so as to be led to the light-projecting lens 3 while light emitted from the light-projecting element 42a is reflected so as to be led to the light-projecting lens 3.

The sum of the optical path length from the light-projecting element 42a to the dichroic mirror 5a and the optical path length from the dichroic mirror 5a to the light-projecting lens 3 and the sum of the optical path length from the light-projecting element 42b to the dichroic mirror 5b and the optical path length from the dichroic mirror 5b to the light-projecting lens 3 are set to be substantially equal to the optical path length from the light-projecting element 42c to the light-projecting lens 3 in consideration of the wavelength of light.

The light-projecting element 42c largest in light quantity is disposed so that light emitted from the light-projecting element 42c is transmitted through the dichroic mirrors 5a and 5b. The light-projecting element 42b smaller in light quantity than the light-projecting element 42c but larger in light quantity than the light-projecting element 42a is disposed so that light emitted from the light-projecting element 42b is transmitted through the dichroic mirror 5a. The light-projecting element 42a smallest in light quantity is disposed so that light emitted from the light-projecting element 42a is not transmitted through the dichroic mirrors 5a and 5b. In this manner, the quantity of light led to the light-projecting lens 3 is made even (equalized).

The light-projecting lens 3 is disposed so that light emitted from the light-projecting elements 42a, 42b and 42c is converged on one end portion of the optical fiber cable 20. The optical fiber cable 20 leads the light L converged by the light-projecting lens 3 to the light-projecting optical system 11 of the sensor head-portion 10 shown in FIG. 2. As a result, the light L converged by the light-projecting lens 3 is output from the light-projecting optical system 11 of the sensor head portion 10 to the object W.

The light-projecting elements 42a, 42b and 42c are switched on successively in a time-division multiplexing manner in accordance with light-emitting timing controlled by the light-projecting control portion 41 shown in FIG. 2.

When the light-projecting element 42a is switched on, green light emitted from the light-projecting element 42a is reflected on the dichroic mirror 5a so as to be led to the light-projecting optical system 11 of the sensor head portion 10 by the light-projecting lens 3 and the optical fiber cable 20 shown in FIG. 2. Finally, the green light is projected onto the detection region.

When the light-projecting element 42b is switched on, blue light emitted from the light-projecting element 42b is reflected on the dichroic mirror 5b. The reflected light is transmitted through the dichroic mirror 5a so as to be led to the light-projecting optical system 11 of the sensor head portion 10 by the light-projecting lens 3 and the optical fiber cable 20 shown in FIG. 2. Finally, the blue light is projected onto the detection region.

When the light-projecting element 42c is switched on, red light emitted from the light-projecting element 42c is transmitted through the dichroic mirrors 5b and 5a so as to be led to the light-projecting optical system 11 of the sensor head portion 10 by the light-projecting lens 3 and the optical fiber cable 20 shown in FIG. 2. Finally, the red light is projected onto the detection region.

When the object W is present in the detection region, light L reflected on the object W is led to the light-receiving element 13 through the light-receiving optical system 12. The color of the object W is detected on the basis of the quantity of red light, the quantity of green light and the quantity of blue light received by the light-receiving element 13.

Signal processing executed by the signal processing control portion 43 shown in FIG. 2 will be described here.

Signal processing executed by the signal processing control portion 43 is performed on the basis of the light-projecting timing signal ST given by the light-projecting control portion 41, a set color value (which will be described later) set by a user's operation on the setting input portion 45, and so son.

For example, the light-projecting control portion 41 first makes the light-projecting element 42a emit light. In this case, the other light-projecting elements 42b and 42c do not emit light. At this point of time, green light L is incident on the light-receiving element 13. The light-receiving element 13 detects the incident green light L and generates a light-receiving signal S1.

On this occasion, the light-receiving signal S1 generated by the light-receiving element 13 is supplied from the light-receiving circuit 14 to the signal processing control portion 43 while a light-projecting timing signal ST to make the light-projecting element 42a emit light is supplied from the light-projecting control portion 41 to the signal processing control portion 43. In this manner, the light-projecting control portion 41 can acquire the quantity of received light which is reflected on the object W when green light L is projected onto the object W.

Then, the light-projecting control portion 41 makes the light-projecting element 42b emit light. In this case, the other light-projecting elements 42a and 42c do not emit light. At this point of time, blue light L is incident on the light-receiving element 13. The light-receiving element 13 detects the incident blue light L and generates a light-receiving signal S1.

Similarly to the above description, the light-receiving signal S1 generated by the light-receiving element 13 is supplied from the light-receiving circuit 14 to the signal processing control portion 43 while a light-projecting timing signal ST to make the light-projecting element 42b emit light is supplied from the light-projecting control portion 41 to the signal processing control portion 43. In this manner, the light-projecting control portion 41 can acquire the quantity of received light which is reflected on the object W when blue light L is projected onto the object W.

Then, the light-projecting control portion 41 makes the light-projecting element 42c emit light. In this case, the other light-projecting elements 42a and 42b do not emit light. At this point of time, red light L is incident on the light-receiving element 13. The light-receiving element 13 detects the incident red light L and generates a light-receiving signal S1.

Similarly to the above description, the light-receiving signal S1 generated by the light-receiving element 13 is supplied from the light-receiving circuit 14 to the signal processing control portion 43 while a light-projecting timing signal ST to make the light-projecting element 42c emit light is supplied from the light-projecting control portion 41 to the signal processing control portion 43. In this manner, the light-projecting control portion 41 can acquire the quantity of received light which is reflected on the object W when red light L is projected onto the object W.

When the quantities of received light obtained as three-color light components reflected on the object W are compared with one another, the color of the object W can be discriminated. This is because the quantity of light L reflected on the object W varies according to the wavelength of light L incident on the object W.

The signal processing control portion 43 calculates the ratio of the quantities of received light with respective colors in order to discriminate the color of the object W on the basis of the quantities of received light with three colors incident on the light-receiving element 13. The ratio of the quantities of received light is hereinafter referred to as "detected color value".

On the other hand, the ratio of the quantities of received light corresponding to a specific color is set by the user in advance in the signal processing control portion 43. The ratio of the quantities of received light set by the user in advance in accordance with such a specific color is hereinafter referred to as "set color value".

The signal processing control portion 43 compares the calculated detected color value with the set color value, generates a detection signal S2 based on a result of the comparison and outputs the detection signal S2 through the output circuit 44.

Figure 9:
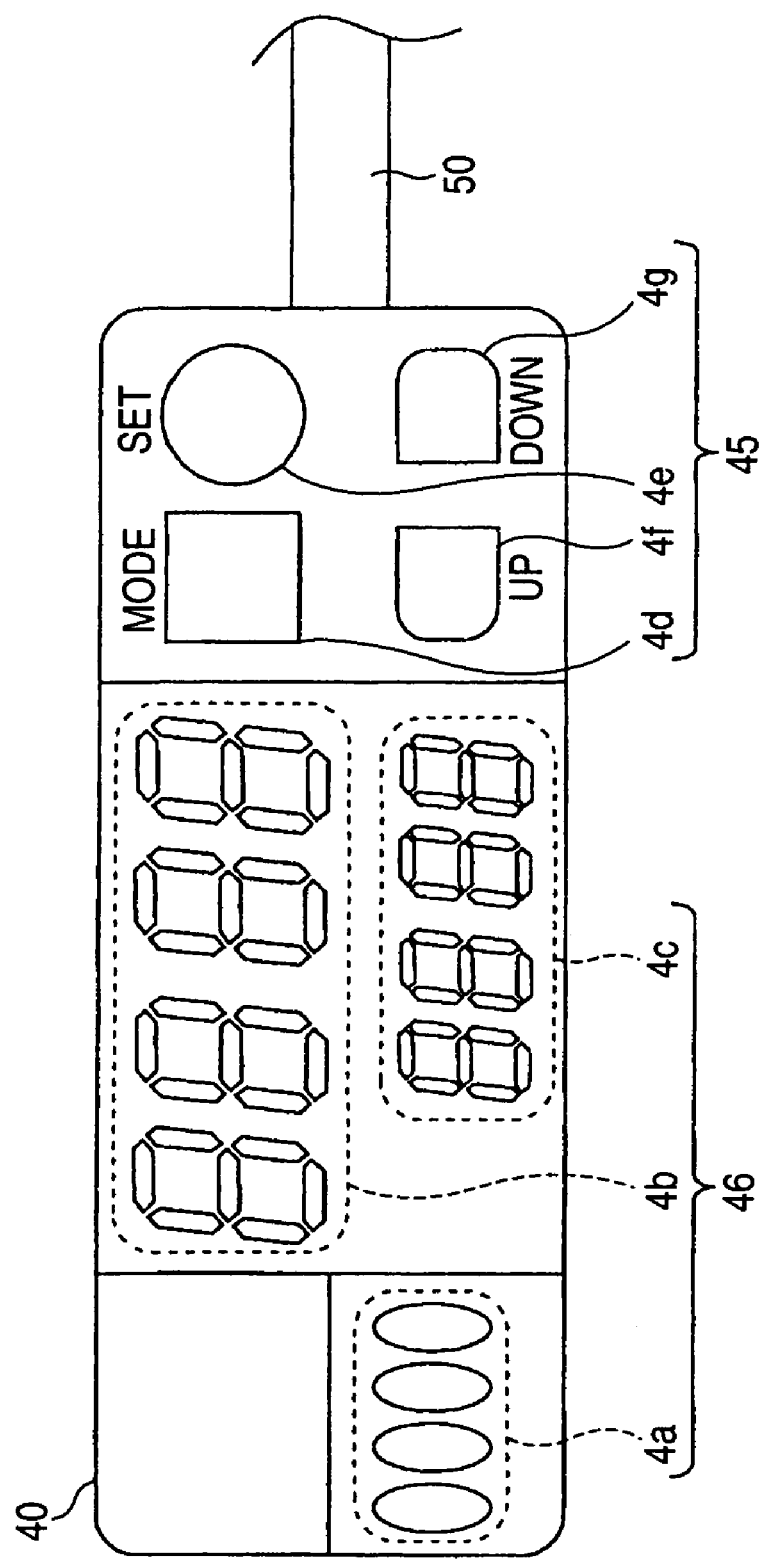
FIG. 9 is a typical view showing an example of a setting input portion and a main body side indicator portion in the photoelectric sensor depicted in FIG. 2.

Next, the setting input portion 45 and the main body side indicator portion 46 shown in FIG. 2 will be described. FIG. 9 is a typical view showing an example of combination of the setting input portion 45 and the main body side indicator portion 46 shown in FIG. 2.

In FIG. 9, the setting input portion 45 has a mode setting switch 4d, an automatic adjustment switch 4e, and set value change switches 4f and 4g. The main body side indicator portion 46 has output indicator lamps 4a, and seven-segment LEDs 4b and 4c.

The mode setting switch 4d is used by the user for changing an operation mode. The automatic adjustment switch 4e is used for adjusting the set color value automatically. The set value change switches 4f and 4g are used for changing the set color value manually. In this embodiment, the set color value can be selected from four values.

The output indicator lamps 4a are switched on and off to indicate the detection state (detection/non-detection) of the object W. In this embodiment, selected one of four detection states corresponding to the four set color values is indicated as the detection state.

For example, the seven-segment LED 4b indicates the quantity of currently received light or the degree of current coincidence almost in real time. The quantity of currently received light is the sum of the quantities of currently received light with three colors. For example, the seven-segment LED 4c indicates the set color value which is set by the user.

As described above, in the photoelectric sensor 100 according to the first embodiment, light L emitted from the light-projecting elements 42a, 42b and 42c of the main body portion 40 is transmitted through the optical fiber cable 20, so that unevenness in quantity of light L can be suppressed. Accordingly, color unevenness can be eliminated and color detection error can be prevented satisfactorily, so that reliability can be improved.

(Second Embodiment)

A photoelectric sensor according to a second embodiment of the invention has the same configuration and operation as those of the photoelectric sensor 100 according to the first embodiment except the following points.

Figure 10:
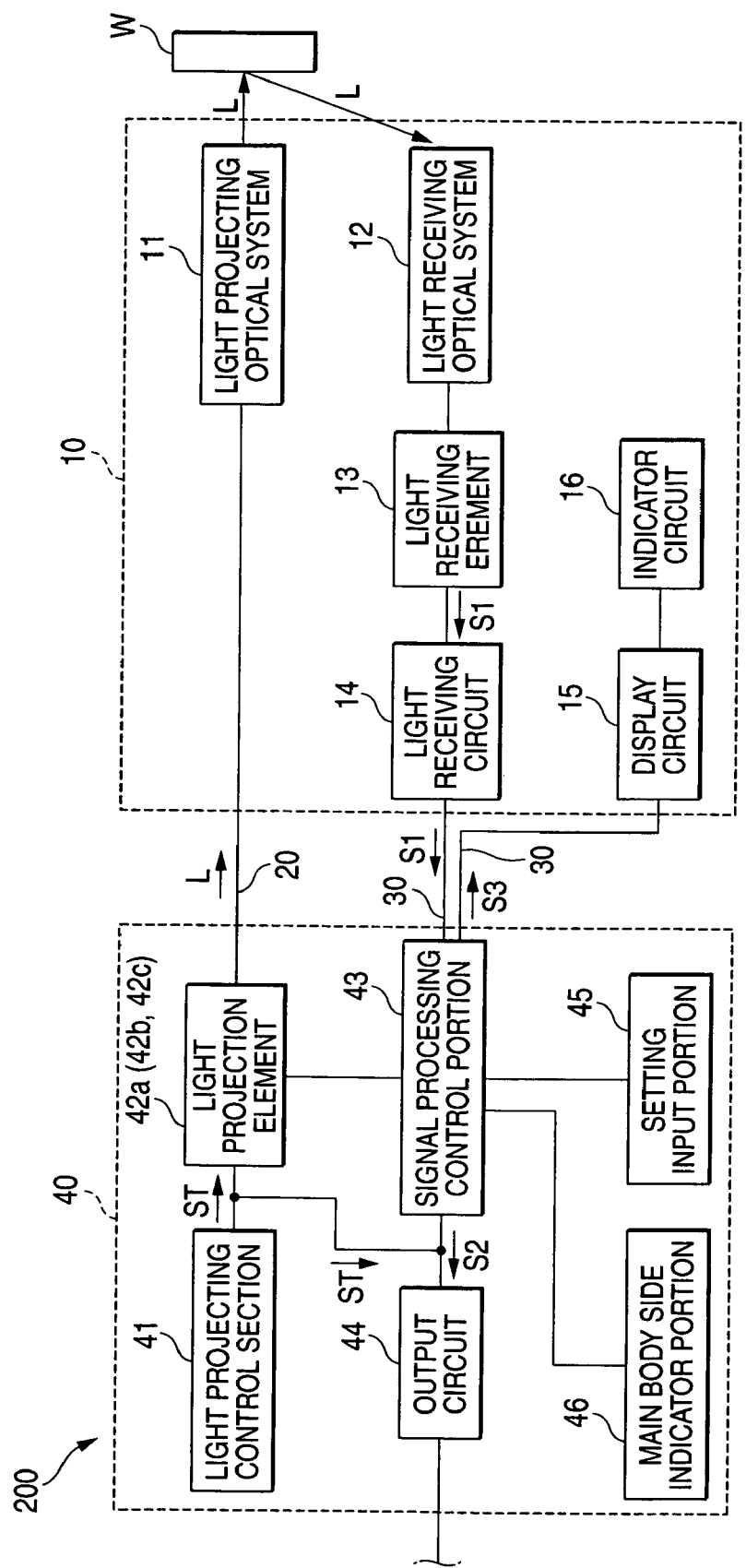
FIG. 10 is a block diagram showing the internal configuration of a photoelectric sensor according to a second embodiment of the invention.

FIG. 10 is a block diagram showing the internal configuration of the photoelectric sensor according to the second embodiment.

The photoelectric sensor 200 according to the second embodiment includes an indicator circuit 15, and at least one indicator lamp 16 in addition to the configuration of the photoelectric sensor 100 according to the first embodiment. The indicator circuit 15 and the indicator lamp 16 are provided in the inside of the sensor head portion 10.

As shown in FIG. 10, the indicator circuit 15 of the sensor head portion 10 is connected to the signal processing control portion 43 of the main body portion 40 by the electric wire cable 30.

The signal processing control portion 43 of the main body portion 40 transmits an indication control signal S3 to the indicator circuit 15 of the sensor head portion 10 through the electric wire cable 30. The indicator circuit 15 of the sensor head portion 10 controls the switching-on operation of the indicator lamp 16 on the basis of the indication control signal S3 transmitted from the signal processing control portion 43.

Figure 11A:
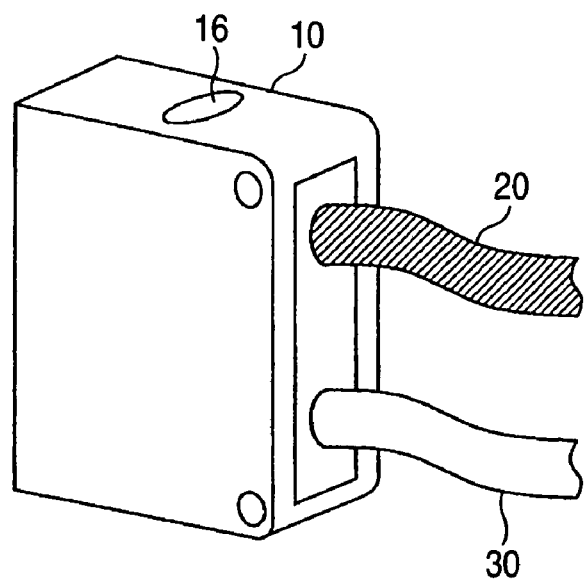
FIG. 11A is a perspective view of the external appearance of a sensor head portion showing an example of indicator lamp arrangement in the photoelectric sensor according to the second embodiment.
Figure 11B:
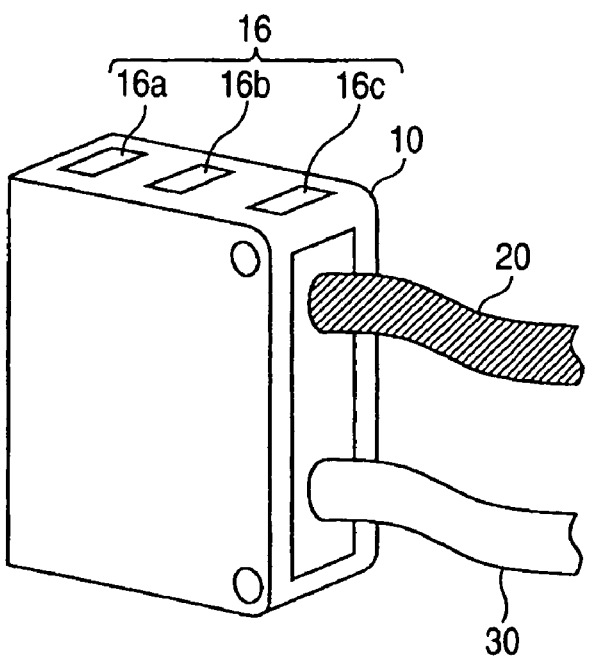
FIG. 11B is a perspective view of the external appearance of a sensor head portion showing another example of indicator lamp arrangement in the photoelectric sensor according to the second embodiment.

FIG. 11A is a perspective view of the external appearance of the sensor head portion 10 showing an example of indicator lamp 16 arrangement in the photoelectric sensor 200 according to the second embodiment. FIG. 11B is a perspective view of the external appearance of the sensor head portion 10 showing another example of indicator lamp 16 arrangement in the photoelectric sensor 200 according to the second embodiment.

In FIG. 11A, an indicator lamp 16 is provided in a top surface of the sensor head portion 10.

In this example, the indication control signal S3 indicating the detection state is transmitted from the signal processing control portion 43 of the main body portion 40 to the indicator circuit 15 of the sensor head portion 10. Thus, the indicator circuit 15 controls the switching-on/off of the indicator lamp 16 on the basis of the indication control signal S3. In this case, the indicator lamp 16 indicates the detection state of the object W by the switching-on/off of the indicator amp 16.

On the other hand, in FIG. 11B, indicator lamps 16 constituted by three light-emitting portions 16a, 16b and 16c are provided in the top surface of the sensor head portion 10.

In this example, an indication control signal S3 indicating the quantity of currently received light and a threshold is transmitted from the signal processing control portion 43 of the main body portion 40 to the indicator circuit 15 of the sensor head portion 10. In this case, the indicator circuit 15 controls the switching-on/off of the light-emitting portions 16a, 16b and 16c of the indicator lamps 16 on the basis of the indication control signal S3.

For example, the indicator circuit 15 controls the light-emitting portions 16a, 16b and 16c so that all the light-emitting portions 16a, 16b and 16c are switched off when the quantity of currently received light is smaller than 90% of the threshold.

Moreover, the indicator circuit 15 controls the light-emitting portions 16a, 16b and 16c so that only one 16c of the light-emitting portions 16a, 16b and 16c is switched on when the quantity of currently received light is not smaller than 90% of the threshold and smaller than the threshold.

Moreover, the indicator circuit 15 controls the light-emitting portions 16a, 16b and 16c so that two 16b and 16c of the light-emitting portions 16a, 16b and 16c are switched on when the quantity of currently received light is not smaller than the threshold and smaller than 110% of the threshold.

In addition, the indicator circuit 15 controls the light-emitting portions 16a, 16b and 16c so that all the light-emitting portions 16a, 16b and 16c are switched on when the quantity of currently received light is not smaller than 110% of the threshold.

Although this example shows the case where the indication control signal S3 indicates the quantity of currently received light and the threshold, the invention may be applied to the case where the indication control signal S3 indicates the degree of allowance(=(quantity of currently received light)/(threshold value)×100). In this case, when a switching-on pattern of the light-emitting portions 16a, 16b and 16c corresponding to the degree of allowance is set in the indicator circuit 15 in advance, the indicator circuit 15 can control the emission states of the light-emitting portions 16a, 16b and 16c on the basis of the indication control signal S3 and the predetermined switching-on pattern.

Alternatively, the indication control signal S3 may indicate the switching-on pattern of the light-emitting portions 16a, 16b and 16c on the basis of the degree of allowance. In this case, the indicator circuit 15 can control the emission states of the light-emitting portions 16a, 16b and 16c on the basis of the indication control signal S3.

As described above, in the photoelectric sensor 200 according to the second embodiment, the user can confirm the detection state or the photo acceptation state due to the photoelectric sensor 200 on the basis of the indicator lamp(s) 16 of the sensor head portion 10 by visually recognizing the indicator lamp(s) 16 of the sensor head portion 10 near the object W far from the main body portion 40. Thus, the sensor head portion 10 can be positioned easily and accurately.

(Detailed Structure of Body Portion According to an Embodiment of the Invention)

The structure of the main body portion 40 in the photoelectric sensor 100 according to an embodiment of the invention will be described in detail.

Figure 12:
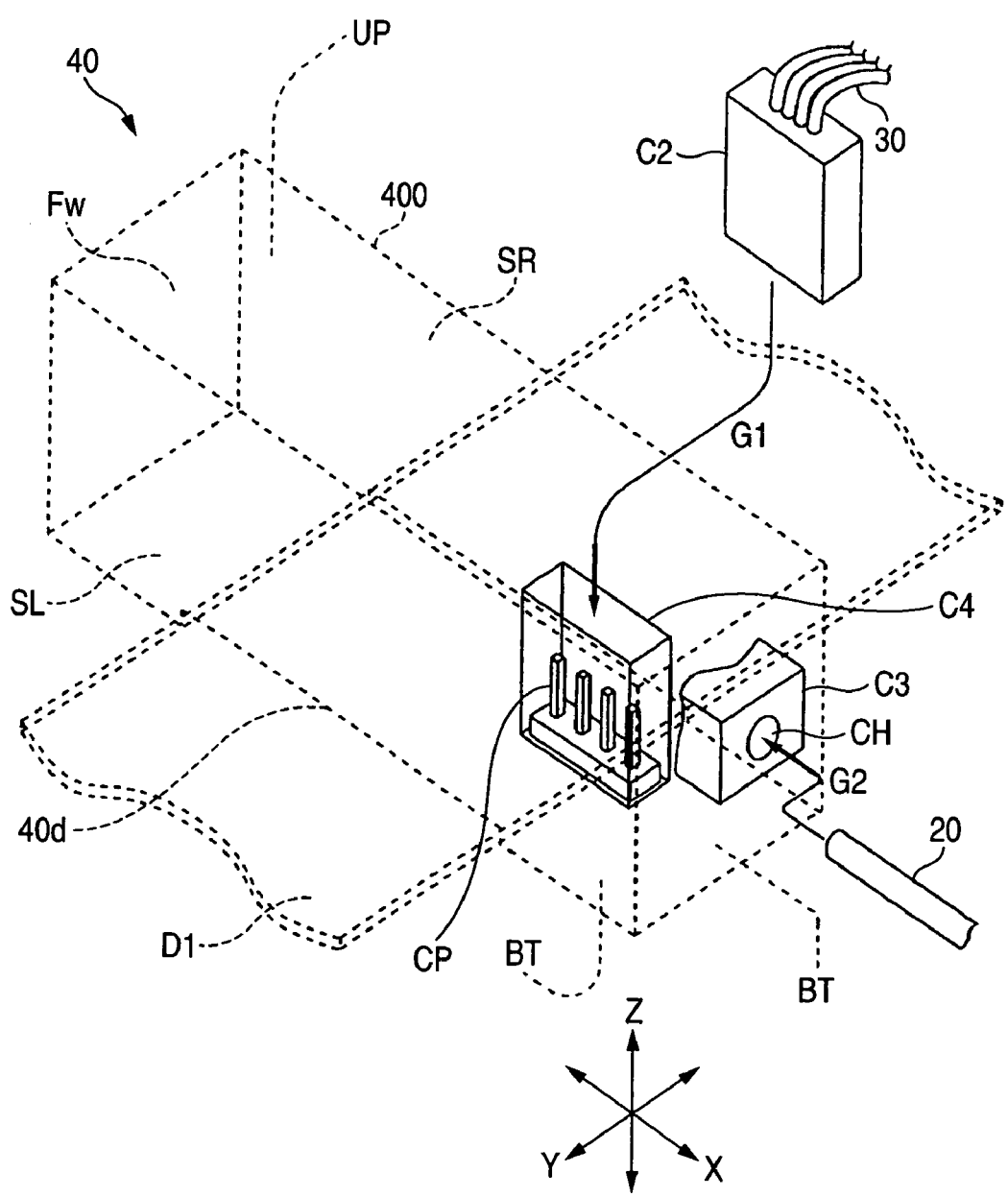
FIG. 12 is a perspective view showing the structure of a main body portion in a photoelectric sensor according to an embodiment of the invention.

FIG. 12 is a perspective view showing the structure of the main body portion 40 in the photoelectric sensor 100 according to an embodiment of the invention. In FIG. 12, the main body portion 40 includes a main body casing 400.

The main body casing 400 has the light emission control portion 41, the light-emitting elements 42a, 42b and 42c, the signal processing control portion 43, and the output circuit 44, as shown in FIG. 2 or 10. The main body casing 400 is substantially shaped like a rectangular parallelepiped having a top surface UP, a bottom surface BT, a front surface FW, a back surface BK, and side surfaces SL and SR.

In the following description, a direction perpendicular both to the front surface FW and to the back surface BK, a direction perpendicular to the side surfaces SL and SR and a direction perpendicular both to the top surface UP and to the bottom surface BT will be referred to as "X direction", "Y direction" and "Z direction", respectively, as represented by arrows X, Y and Z in FIG. 12.

As shown in FIG. 12, a rail fixing groove 40d is formed in the bottom surface BT of the main body portion 40 according to the invention so as to extend in the Y direction. For example, the rail fixing groove 40d can be fitted to a DIN (German Industrial Standard) rail DI.

A connector C4 is provided in the inside of the main body casing 400. The connector C4 has connector pins CP. The connector pins CP are arranged at regular intervals in the X direction and extend in the Z direction.

A rectangular opening portion extending in the X direction is provided in the top surface of the main body casing 400. A connector C2 is shaped like a rectangular parallelepiped. The connector C2 has holes which are provided in the lower end of the connector C2 so that the connector pins CP can be fitted into the holes. The connector C2 provided at one end of the electric wire cable 30 is inserted into the connector C4 through the opening portion provided in the top surface UP as represented by an arrow G1 in FIG. 12. In this manner, the connectors C2 and C4 are connected to each other.

Further, a connector C3 is provided in the inside of the main body casing 400. The connector C3 has a slot portion CH extending in the X direction.

A circular opening portion is formed in the back surface BK of the main body casing 400. One end of the optical fiber cable 20 is inserted into the slot portion CH of the connector C3 through the opening portion provided in the back surface BK as represented by an arrow G2 in FIG. 12.

Although this embodiment shows the case where the main body portion 40 and the optical fiber cable 20 are connected to each other by the connector C3 of the main body portion 40 and one end of the optical fiber cable 20, the invention is not limited thereto. For example, the main body portion 40 and the optical fiber cable 20 may be connected to each other by the connector C3 of the main body portion 40 and a connector C1 which is provided at one end of the optical fiber cable 20 as shown in FIG. 1.

The connection between the connector C4 of the main body portion 40 and the connector C2 of the electric wire cable 30 will be described in detail with reference to FIGS. 13A through 15.

FIGS. 13A and 13B and FIGS. 14A and 14B are views for explaining the connection between the connector C2 of the electric wire cable 30 and the connector C4 of the main body portion 40. FIG. 15 is a perspective view showing an example of a movable member provided in the connector C4 of the main body portion 40.

In FIGS. 13A and 13B and FIGS. 14A and 14B, partly cutaway views of the side surface SL of the main body portion 40 are shown for explaining the connection between the connector C2 of the electric wire cable 30 and the connector C4 of the main body portion 40. In FIGS. 13A and 13B and FIGS. 14A and 14B, X, Y and Z directions are settled in the same manner as in FIG. 12.

Figure 13A:
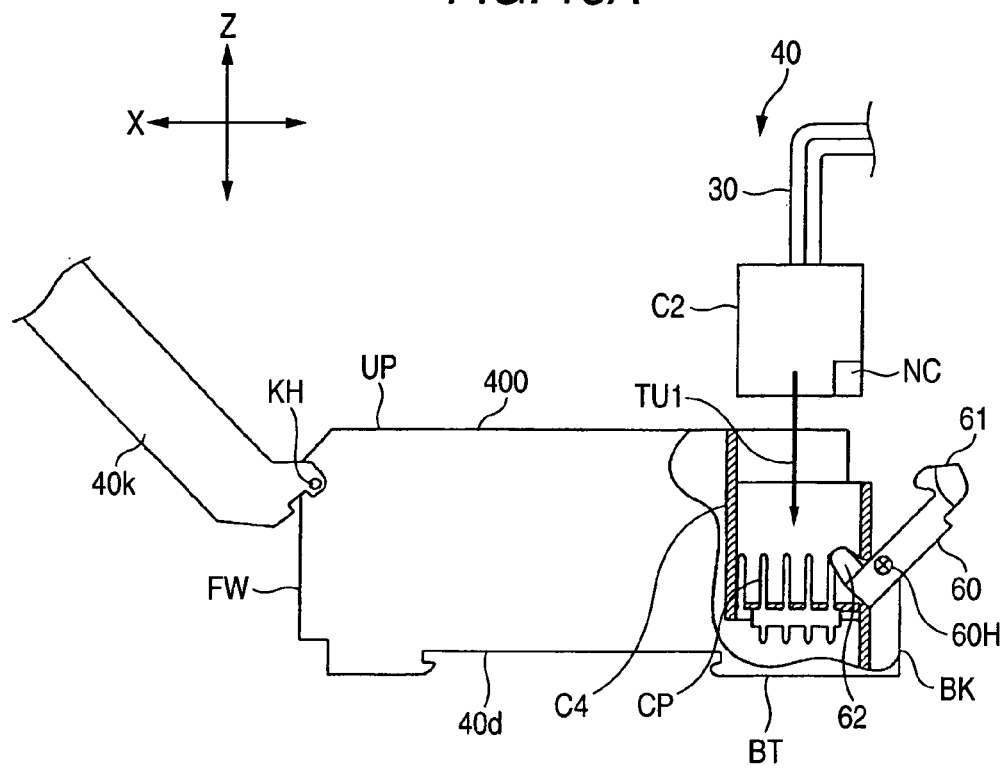
FIGS. 13A and 13B are views for explaining connection between a connector of an electric wire cable and a connector of a main body portion.

As shown in FIG. 13A, the connector C2 of the electric wire cable 30 is inserted into the connector C4 in the direction of an arrow TU1. A notch NC is provided in a corner on the lower end side of a side surface of the connector C2.

Figure 13B:
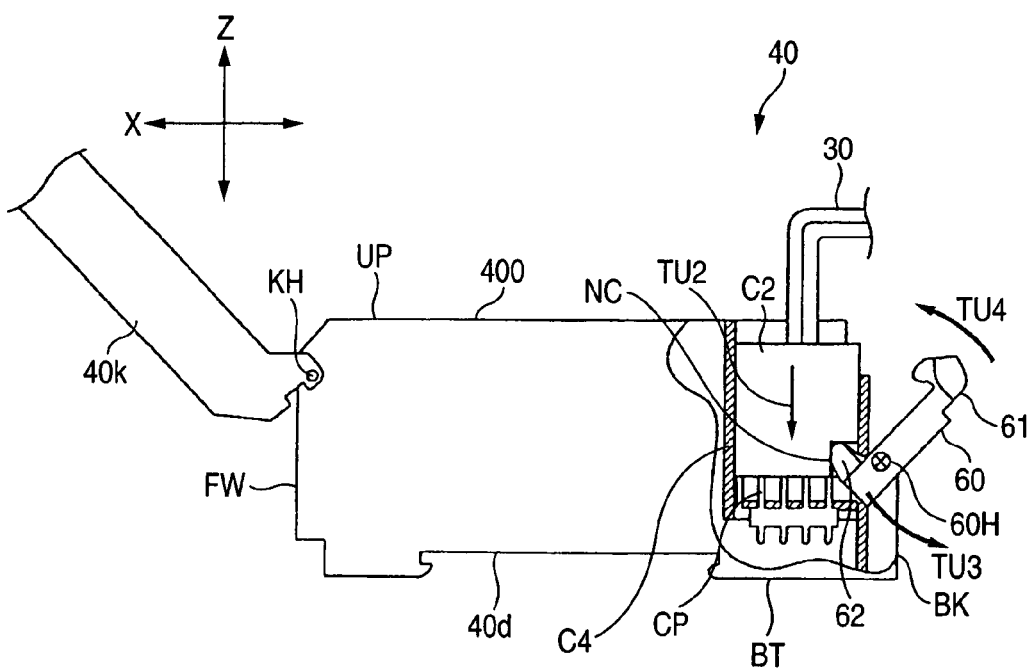

As represented by an arrow TU2 in FIG. 13B, the connector C2 of the electric wire cable 30 is inserted slowly into the connector C4. Thus, an upper end portion of the notch NC of the electric wire cable 30 abuts against an upper end portion of a protrusion piece 62 of a movable member 60.

When the connector C2 of the electric wire cable 30 is further inserted into the connector C4 in the direction of the arrow TU2 in this state, the movable member 60 pivots on a rotary shaft 60H.

The movable member 60 has a structure shown in FIG. 15. As shown in FIG. 15, the movable member 60 has such a long shape that the rotary shaft 60H is provided in a neighborhood of the lengthwise center portion of the movable member 60. In this manner, the movable member 60 can pivot on the rotary shaft 60H in directions of arrows shown in FIG. 15.

A fixation piece 61 is provided on the upper end side of the movable member 60 so as to be integrated with the movable member 60. The fixation piece 61 has a lever portion 61a, and a connector abutment portion 61b. A depressed portion 61c is formed between the upper end of the movable member 60 and the fixation piece 61.

According to the structure of the movable member 60, as shown in FIG. 13B, the protrusion piece 62 pivots on the rotary shaft 60H in the direction of an arrow TU3 while the fixation piece 61 pivots on the rotary shaft 60H in the direction of an arrow TU4.

Figure 14A:
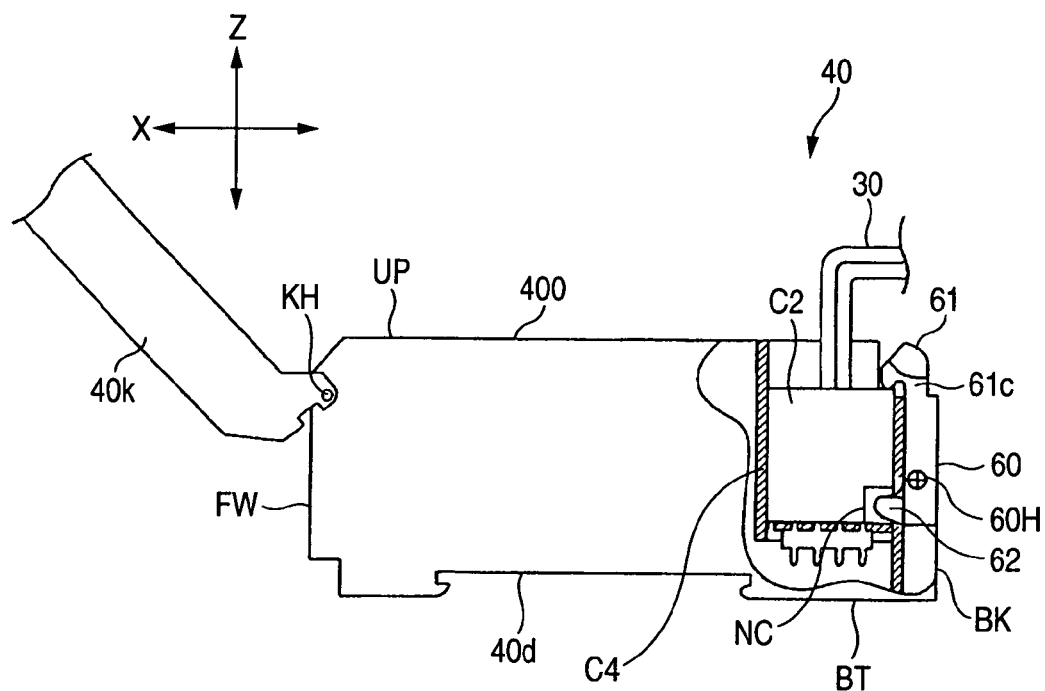
FIGS. 14A and 14B are views for explaining connection between a connector of an electric wire cable and a connector of a main body portion.
Figure 15:
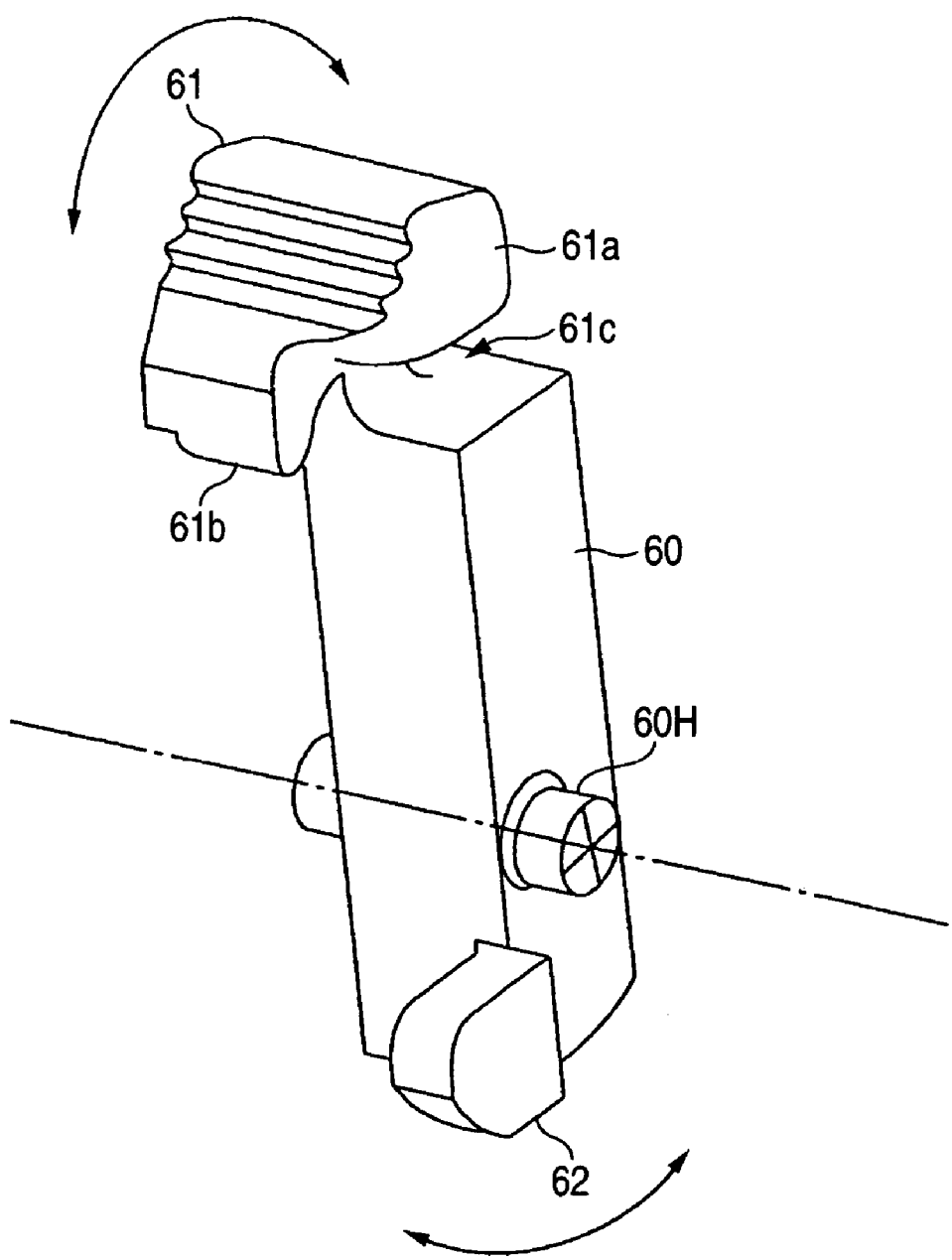
FIG. 15 is a perspective view showing an example of a movable member provided in the connector of the main body portion.

As shown in FIG. 14A, when the movable member 60 pivots in the condition that the connector C2 of the electric wire cable 30 is inserted into the connector C4 so as to reach the bottom of the connector C4, the upper end of the connector C2 of the electric wire cable 30 is locked in a lower end of the connector abutment portion 61b (FIG. 15) of the fixation piece 61.

When the upper end of the connector C2 of the electric wire cable 30 is locked in the lower end of the connector abutment portion 61b in this manner, the connector C2 of the electric wire cable 30 is fixed in the condition that the connector C2 is connected to the connector C4 of the main body portion 40.

On the other hand, the connector C2 of the electric wire cable 30 can be disconnected from the connector C4 of the main body portion 40 as follows. When the movable member 60 pivots on the rotary shaft 60H in a direction reverse to the direction of the arrow TU4 shown in FIG. 13B, the fixation piece 61 can be detached from the upper end of the connector C2.

In this case, the protrusion piece 62 of the movable member 60 pushes up the upper end of the notch NC of the connector C2 of the electric wire cable 30. Thus, the connector C2 of the electric wire cable 30 can be removed from the connector C4 of the main body portion 40 easily.

Figure 14B:
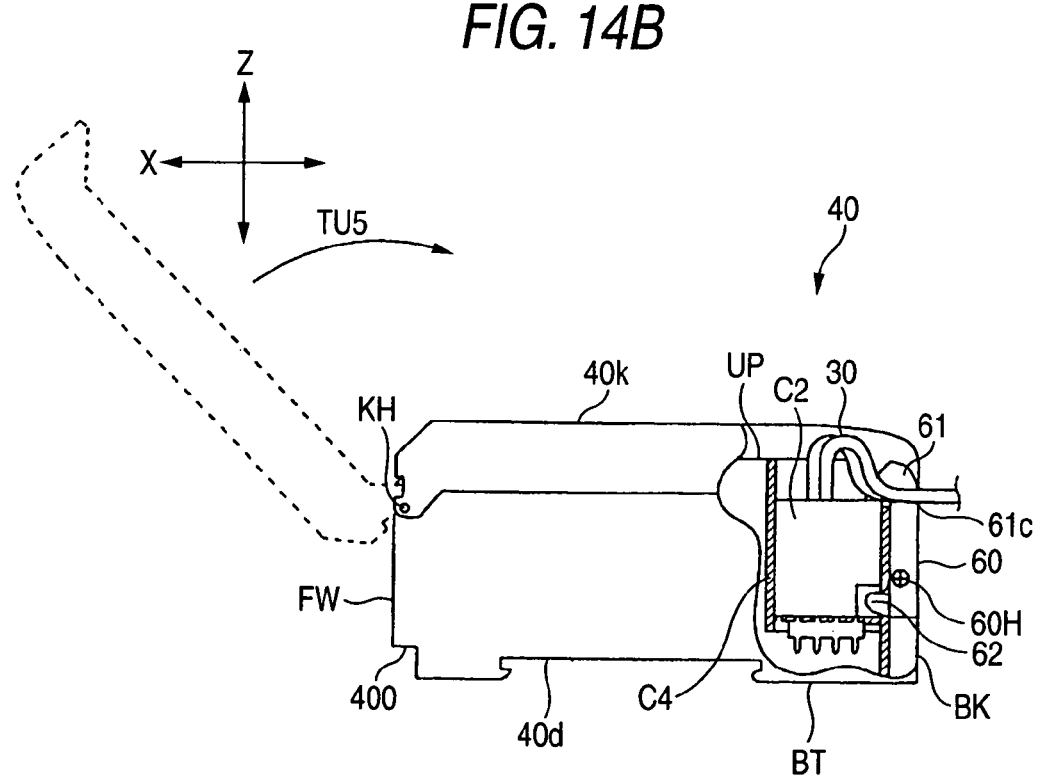

As shown in FIG. 14B, a cover 40k is provided so that the cover 40k can be opened and closed in the condition that the connector C2 of the electric wire cable 30 is connected and fixed to the connector C4 of the main body portion 40. That is, when the cover 40k pivots on a shaft KH in the direction of an arrow TU5, the cover 40k is closed so that the top surface UP of the main body portion 40 can be covered with the cover 40k.

The electric wire cable 30 extending from the connector C2 is fitted into the depressed portion 61c shown in FIG. 15. The electric wire cable 30 is therefore fixed so as to extend in the X direction from the back surface BK through a cable leader portion which is provided in the cover 40k as will be described later.

Figure 16A:
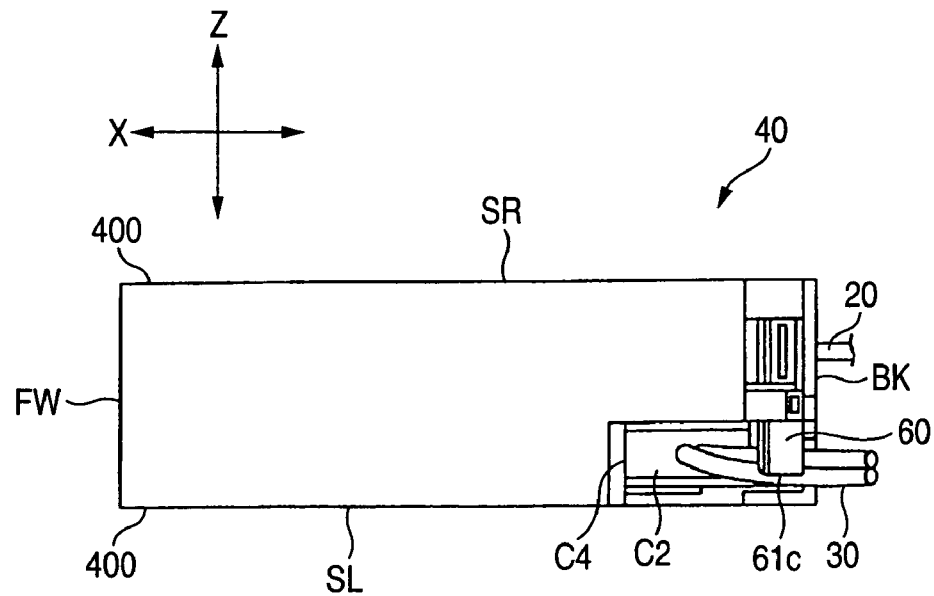
FIG. 16A is a plan view of the main body portion in a state in which a cover is opened.
Figure 16B:
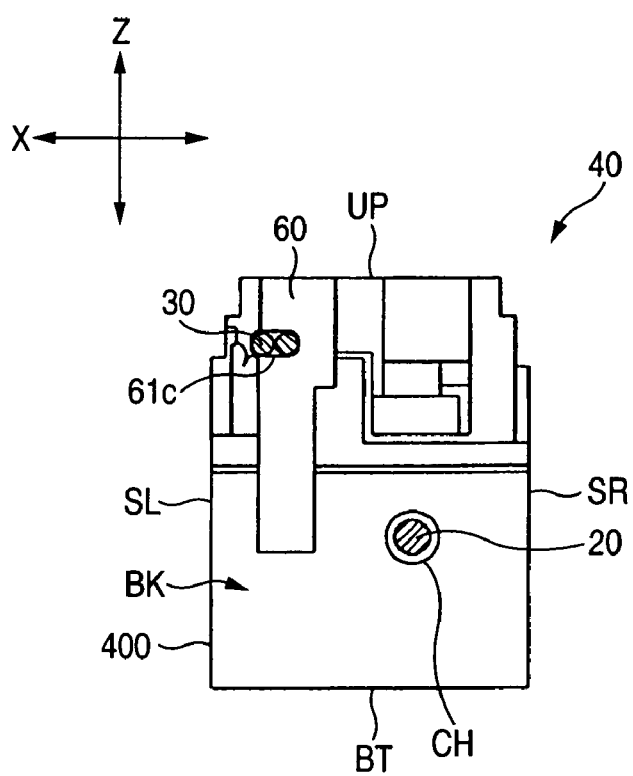
FIG. 16B is a rear view of the main body portion in this state.

FIG. 16A is a plan view of the main body portion 40 in a state in which the cover 40k is opened. FIG. 16B is a rear view of the main body portion 40 in this state. In FIGS. 16A and 16B, X, Y and Z directions are settled in the same manner as in FIG. 12.

As shown in FIGS. 16A and 16B, the connector C2 of the electric wire cable 30 is connected to the connector C4 of the main body portion 40 and fixed by the movable member 60. The electric wire cable 30 extends in the X direction from the back surface BK through the depressed portion 61c of the movable member 60.

Figure 17A:
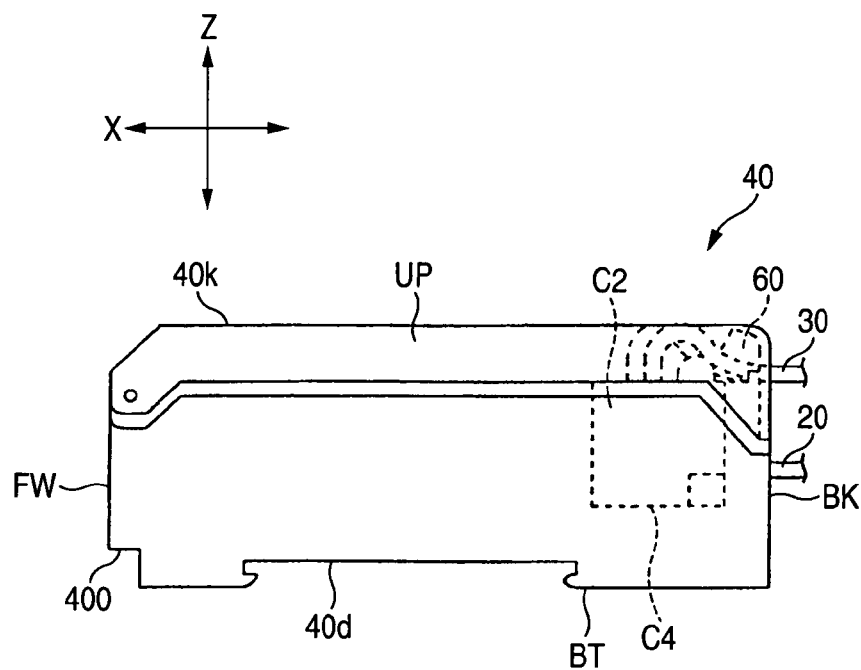
FIG. 17A is a side view of the main body portion in a state in which the cover is closed.
Figure 17B:
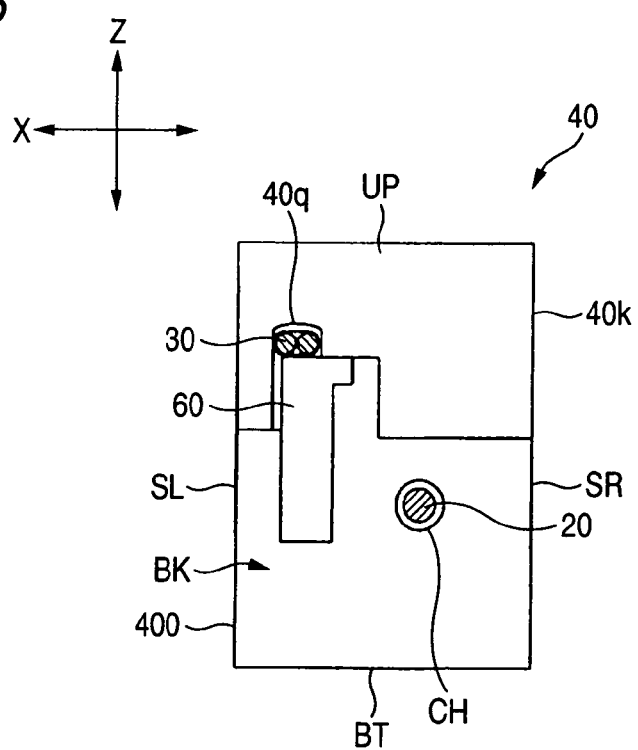
FIG. 17B is a rear view of the main body portion in this state.

FIG. 17A is a side view of the main body portion 40 in a state in which the cover 40k is closed. FIG. 17B is a rear view of the main body portion 40 in this state. In FIGS. 17A and 17B, X, Y and Z directions are settled in the same manner as in FIG. 12. Incidentally, in FIG. 17A, the broken line shows the connection state of the connector C2 of the electric wire cable 30.

As shown in FIG. 17B, a cable leader portion 40q is provided in the cover 40k so that the electric wire cable 30 can be led out of the cover 40k through the cable leader portion 40q. Accordingly, as shown in FIGS. 17A and 17B, the electric wire cable 30 can extend in the X direction from the back surface BK of the main body portion 40 through the cable leader portion 40q of the cover 40k while the connector C2 of the electric wire cable 30 is connected to the connector C4 of the main body portion 40 even in the case where the cover 40k is opened.

Further, the optical fiber cable 20 connected to the connector C3 of the main body portion 40 is shown in FIGS. 16A and 16B and FIGS. 17A and 17B. The optical fiber cable 20 also extends in the X direction from the back surface BK of the main body portion 40 in the same manner as the electric wire cable 30.

Figure 18A:
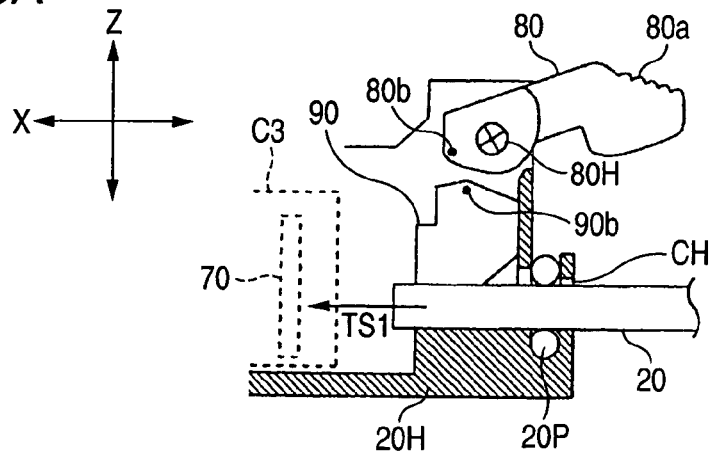
FIGS. 18A to 18C are views for explaining connection between the optical fiber cable and the connector of the main body portion.
Figure 18B:
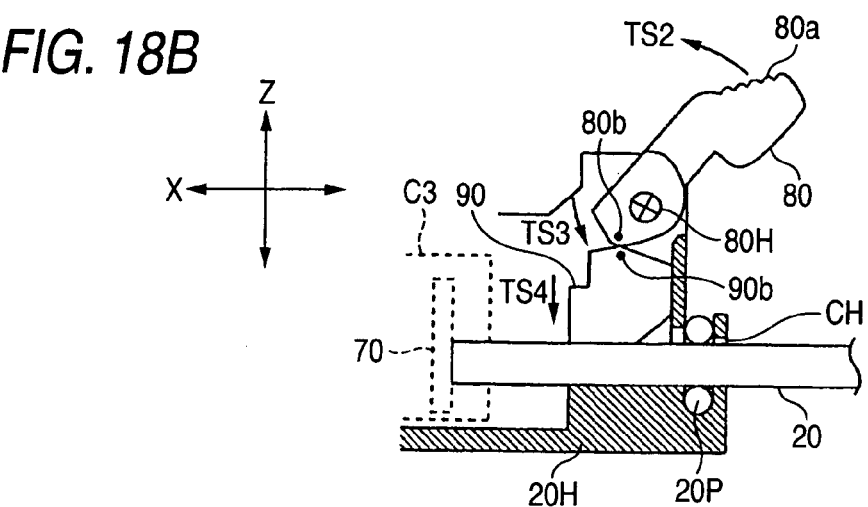
Figure 18C:
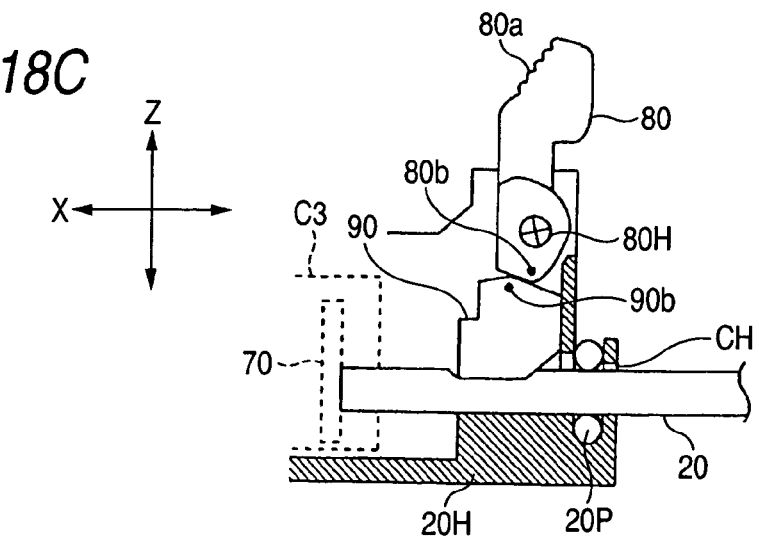

Connection between the connector C3 of the main body portion 40 and the optical fiber cable 20 will be described in detail with reference in FIGS. 18A to 18C. FIGS. 18A to 18C are views for explaining the connection between the optical fiber cable 20 and the connector C3 of the main body portion 40. In FIGS. 18A to 18C, X, Y and Z directions are settled in the same manner as in FIG. 12. In the following description, the optical fiber cable 20 has a circular section.

In FIGS. 18A to 18C, a section of a connection portion of the main body portion 40 for connecting the optical fiber cable 20 is shown for explaining the connection between the connector C3 and the optical fiber cable 20.

In FIG. 18A, the optical fiber cable 20 is inserted into the built-in connector C3 of the main body portion 40 in the direction of an arrow TS1. A cable abutment surface 70 is provided in the inside of the connector C3. An end portion of the optical fiber cable 20 is made to abut against the cable abutment surface 70.

As shown in FIG. 18A, a holder member 20H, a packing 20P, an elevating member 90 and a rotary member 80 for fixing the optical fiber cable 20 are provided together with the connector C3 in the connection portion of the main body portion 40 for connecting the optical fiber cable 20.

The slot portion CH for inserting the optical fiber cable 20 therein is provided in the holder member 20H. The slot portion CH is formed to extend in the X direction and communicates with the outside through the opening portion provided in the back surface BK of the main body portion 40. Thus, insertion/removal of the optical fiber cable 20 can be performed in the X direction from the outside.

The packing 20P is provided to form a part of the slot portion CH. The inner diameter of the packing 20P is equal to or slightly smaller than the outer diameter of the optical fiber cable 20. Thus, there is no gap formed between the outer diameter of the optical fiber cable 20 and the packing 20P when the optical fiber cable 20 is inserted into the slot portion CH. As a result, external light can be prevented from leaking out of the slot portion CH into the main body portion 40.

The holder member 20H is used in combination with the elevating member 90 and the rotary member 80 which are provided on the front surface FW side of the main body portion 40. The elevating member 90 is provided near the center of the connection portion so as to be movable upward and downward (movable in the Z direction) while the rotary member 80 is provided so as to be adjacent to an upper portion of the elevating member 90.

A smooth corner 90b is formed at an upper end portion of the elevating member 90. The rotary member 80 has a predetermined long shape. A hinge 80H is provided on one end side of the rotary member 80. The rotary member 80 can rotate around the hinge 80H. A smooth corner 80b is provided at one end portion of the rotary portion 80 where the hinge 80H is provided. A lever portion 80a is provided on the other end portion of the rotary member 80.

As shown in FIG. 18B, when the lever portion 80a turns in the direction of an arrow TS2 in the condition that the optical fiber cable 20 is inserted into the slot portion CH so as to have its one end portion reach the cable abutment surface 70 of the connector C3, the corner 80b rotates in the direction of an arrow TS3 (opposite to the direction of the arrow TS2).

As a result, the corner 80b of the rotary member 80 and the corner 90b of the elevating member 90 slide while abutting on each other. Accordingly, the elevating member 90 moves down as represented by an arrow TS4.

As shown in FIG. 18C, when the rotary member 80 further rotates so as to be vertical, the elevating member 90 moved down by the corner 80b of the rotary member 80 stops in a state in which the upper portion of the optical fiber cable 20 is pressed against a lower end portion of the elevating member 90. Thus, the upper and lower portions of the optical fiber cable 20 are fixedly held between the holder member 20H and the lower end portion of the elevating member 90. As a result, the optical fiber cable 20 is fixed to the main body portion 40 in a state in which the optical fiber cable 20 abuts on the cable abutment surface 70 of the connector C3.

In this manner, the optical fiber cable 20 and the electric wire cable 30 extend in the X direction from the back surface BK of the main body casing 400. As a result, it is easy to extend both the optical fiber cable 20 and the electric wire cable 30 in a predetermined direction. Accordingly, it is easy to install the main body portion 40.

As shown in FIG. 9, the main body side indicator portion 46 is formed in the top surface UP. Since the optical fiber cable 20 and the electric wire cable 30 connected to the main body portion 40 extend out from the back surface BK, information indicated by the main body side indicator portion 46 can be prevented from being obstructed by the optical fiber cable 20 and the electric wire cable 30. Accordingly, an operating person can view the information indicated by the main body side indicator portion 46 from all directions.

Moreover, since the connector C2 of the electric wire cable 30 and the electric wire cable 30 are fixed to the main body portion 40 by the movable member 60 shown in FIG. 15, the connector C4 of the main body portion 40 and the connector C2 of the electric wire cable 30 can be connected to each other surely. Accordingly, the connector C2 of the electric wire cable 30 can be prevented from dropping out of the connector C4 of the main body portion 40.

Moreover, since the optical fiber cable 20 is fixed to the main body portion 40 by the holder member 20H, the rotary member 80 and the elevating member 90 shown in FIGS. 18A to 18C, the connector C3 of the main body portion 40 and the optical fiber cable 20 can be connected to each other surely. Accordingly, the optical fiber cable 20 can be prevented from dropping out of the connector C3 of the main body portion 40.

Although the structure of the main body portion 40 according to an embodiment of the invention has been described, the main body portion 40 may have any one of the following structures.

Figure 19:
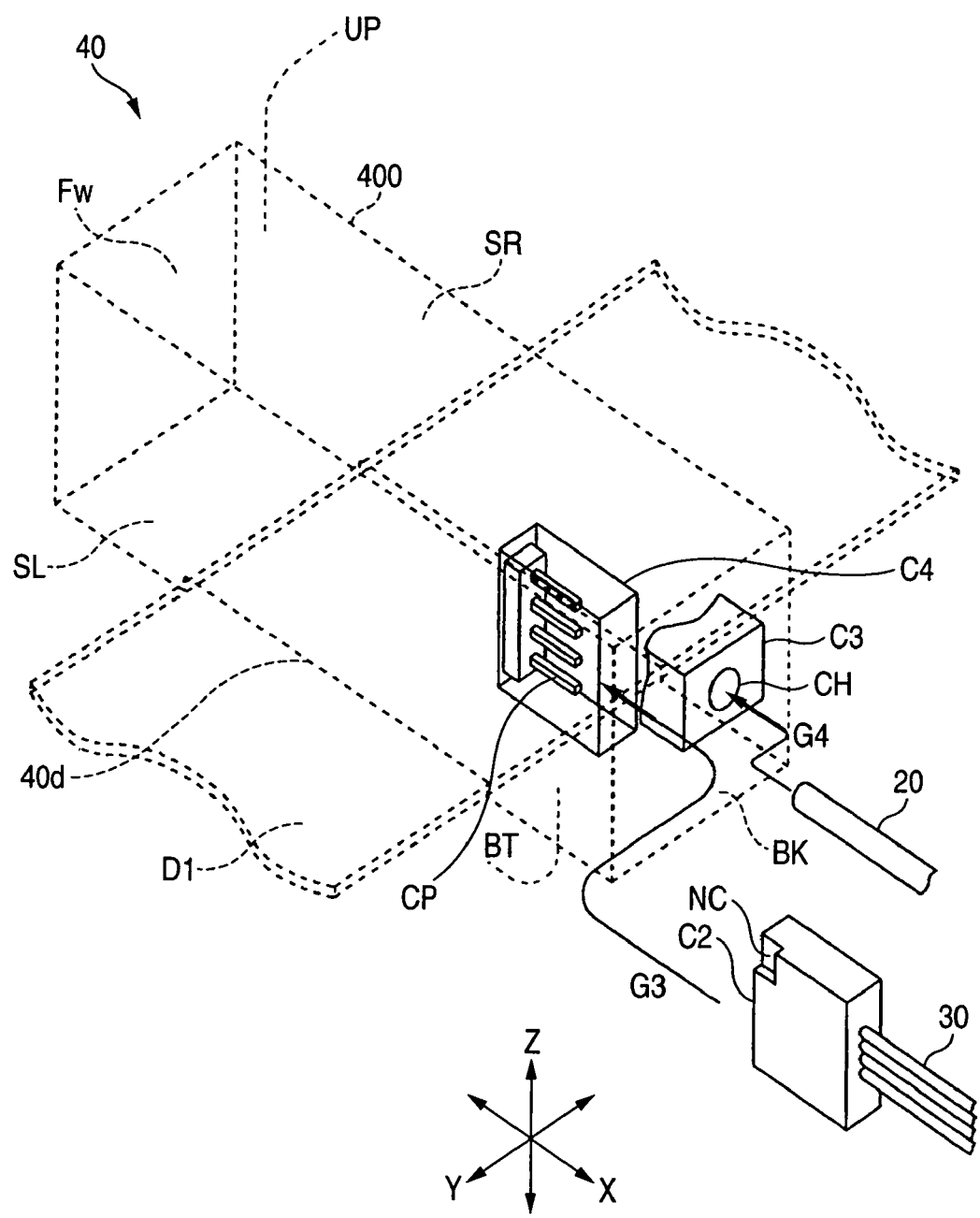
FIG. 19 is a typical view showing another example of configuration of the main body portion according to an embodiment of the invention.

FIG. 19 is a typical view showing another example of structure of the main body portion 40 according to an embodiment of the invention. The difference between the structure of the main body portion 40 shown in FIG. 19 and the structure of the main body portion 40 shown in FIG. 12 is as follows. In the structure shown in FIG. 19, a connector C4 is disposed in the main body portion 40 so that a connector C2 of the electric wire cable 30 can be inserted into the connector C4 of the main body portion 40 from a back surface BK of the main body portion 40.

In FIG. 19, the built-in connector C4 of a main body casing 400 has connector pins CP which are arranged at regular intervals in the Z direction so as to extend in the X direction.

A rectangular opening portion extending in the Z direction is provided in the back surface BK of the main body casing 400. The connector C2 provided at one end of the electric wire cable 30 is inserted into the connector C4 through the opening portion of the back surface BK as represented by an arrow G3. Accordingly, the connectors C2 and C4 are connected to each other.

Also in this example, a circular opening portion is provided in the back surface BK of the main body casing 400. One end of the optical fiber cable 20 is inserted into a slot portion CH of a connector C3 through the circular opening portion of the back surface BK as represented by an arrow G4. Thus, the connector C3 and the optical fiber cable 20 are connected to each other.

Also in the main body portion 40 shown in FIG. 19, a movable member 60 for fixing the connector C2 of the electric wire cable 30 and a combination of a holder member 20H, a rotary member 80 and an elevating member 90 are provided in connection portions of the main body portion 40 for connecting the electric wire cable 30 and the optical fiber cable 20 respectively.

Accordingly, the connector C2 of the electric wire cable 30 and the electric wire cable 30 are fixed to the main body portion 40 by the movable member 60. The optical fiber cable 20 is fixed to the main body portion 40 by the holder member 20H, the rotary member 80 and the elevating member 90. Incidentally, in the example, the electric wire cable 30 is not inserted into the depressed portion 61c shown in FIG. 15.

Figure 20:
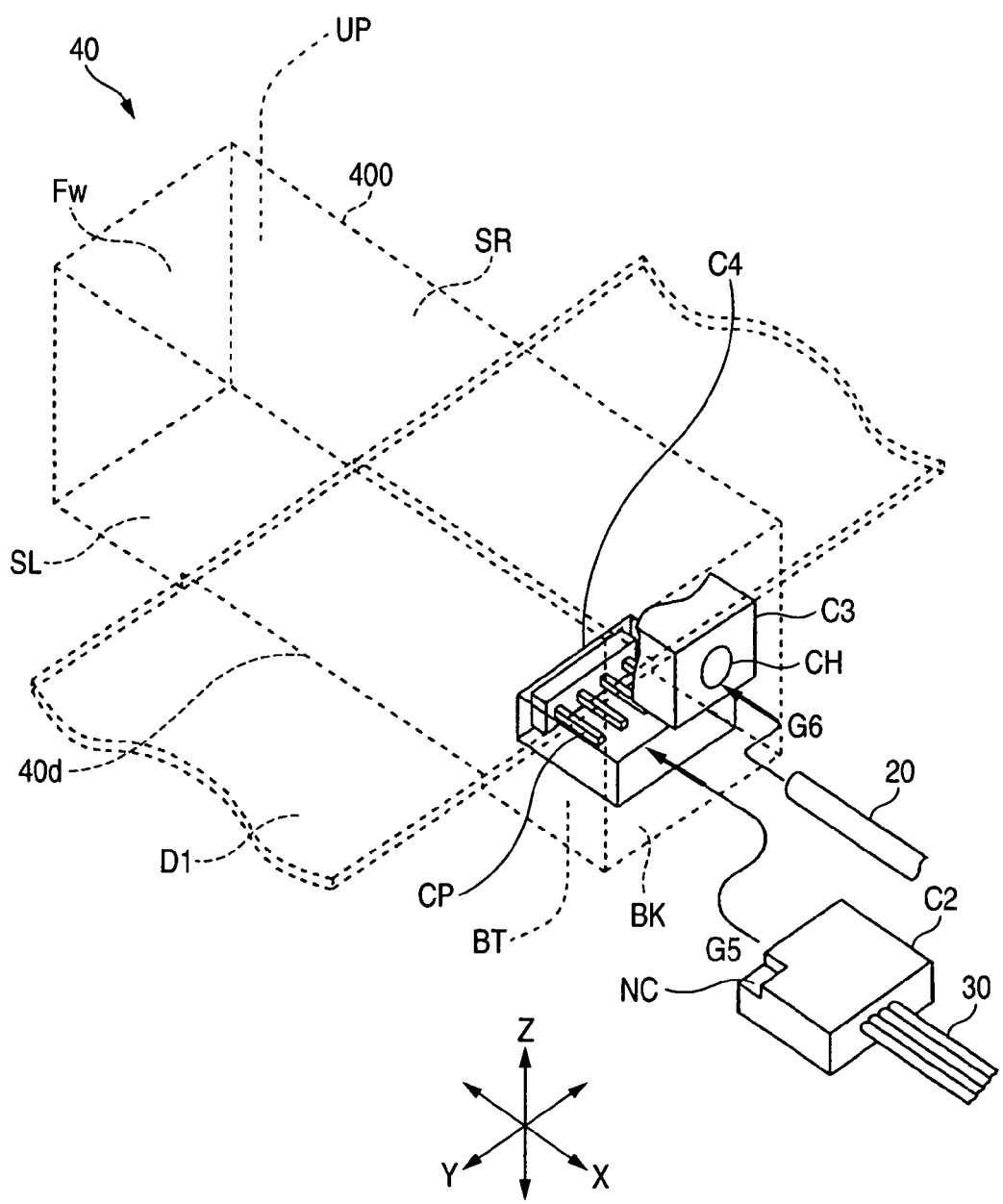
FIG. 20 is a typical view showing a further example of configuration of the main body portion according to an embodiment of the invention.

FIG. 20 is a typical view showing a further example of structure of the main body portion 40 according to an embodiment of the invention. The difference between the structure of the main body portion 40 shown in FIG. 20 and the structure of the main body portion 40 shown in FIG. 12 is as follows. In the structure shown in FIG. 20, a connector C4 is disposed in the main body portion 40 so that a connector C2 of the electric wire cable 30 can be inserted into the connector C4 of the main body portion 40 from a back surface BK of the main body portion 40.

In FIG. 20, the built-in connector C4 of a main body casing 400 has connector pins CP which are arranged at regular intervals in the Y direction so as to extend in the X direction.

A rectangular opening portion extending in the Y direction is provided in the back surface BK of the main body casing 400. The connector C2 provided at one end of the electric wire cable 30 is inserted into the connector C4 through the opening portion of the back surface BK as represented by an arrow G5. Thus, the connectors C2 and C4 are connected to each other.

Also in this example, a circular opening portion is provided in the back surface BK of the main body casing 400. One end of the optical fiber cable 20 is inserted into a slot portion CH of a connector C3 through the opening portion of the back surface BK as represented by an arrow G6. Thus, the connector C3 and the optical fiber cable 20 are connected to each other.

Also in the main body portion 40 shown in FIG. 20, a movable member 60 for fixing the connector C2 of the electric wire cable 30 and a combination of a holder member 20H, a rotary member 80 and an elevating member 90 are provided in connection portions of the main body portion 40 for connecting the electric wire cable 30 and the optical fiber cable 20 respectively. Accordingly, the main body portion 40 can fix the electric wire cable 30 and the optical fiber cable 20 respectively when the electric wire cable 30 and the optical fiber cable 20 are connected to the main body portion 40. In this example, the electric wire cable 30 is not inserted into the depressed portion 61c shown in FIG. 15.

Also in the example, in accordance with the structure, the electric wire cable 30 extending from the connector C2 connected to the connector C4 can extend out from the back surface BK of the main body portion 40. Accordingly, also in the main body portion 40 shown in FIG. 20, the optical fiber cable 20 and the electric wire cable 30 extend out from the back surface BK, so that it is easy to extend both the optical fiber cable 20 and the electric wire cable 30 in a predetermined direction. Accordingly, it is easy to install the main body portion 40.

The aforementioned main body side indicator portion 46 is provided in neither the side surface SL nor the side surface SR of the main body portion 40 shown in FIG. 12, 19 or 20, and the optical fiber cable 20, the electric wire cable 30 and the output cable 50 are also provided in neither the side surface SL nor the side surface SR of the main body portion 40 shown in FIG. 12, 19 or 20. Accordingly, a plurality of main body portions 40 can be mounted on a DIN rail DI so that the respective side surfaces SL and SR of the main body portions 40 are adjacent to one another. As a result, the space required for mounting the main body portions 40 can be saved.

(Detailed Structure of Sensor Head Portion According to an Embodiment of the Invention)

The structure of the sensor head portion 10 of the photoelectric sensor 100 according to an embodiment of the invention will be described in detail.

Figure 21A:
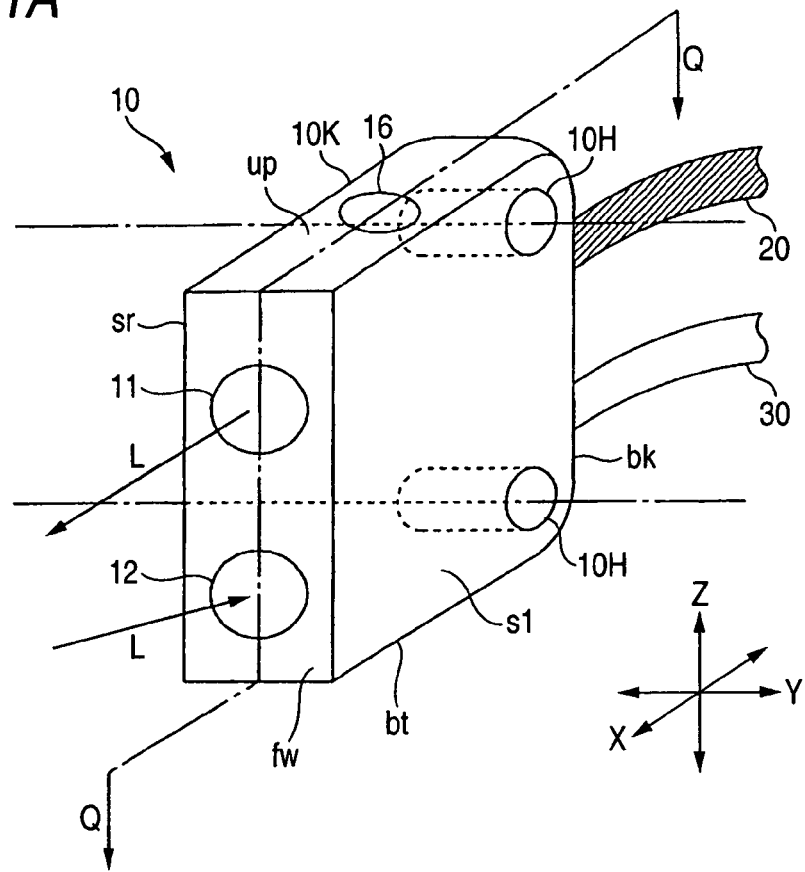
FIGS. 21A and 21B are typical views showing an example of structure of the sensor head portion according to an embodiment of the invention.
Figure 21B:
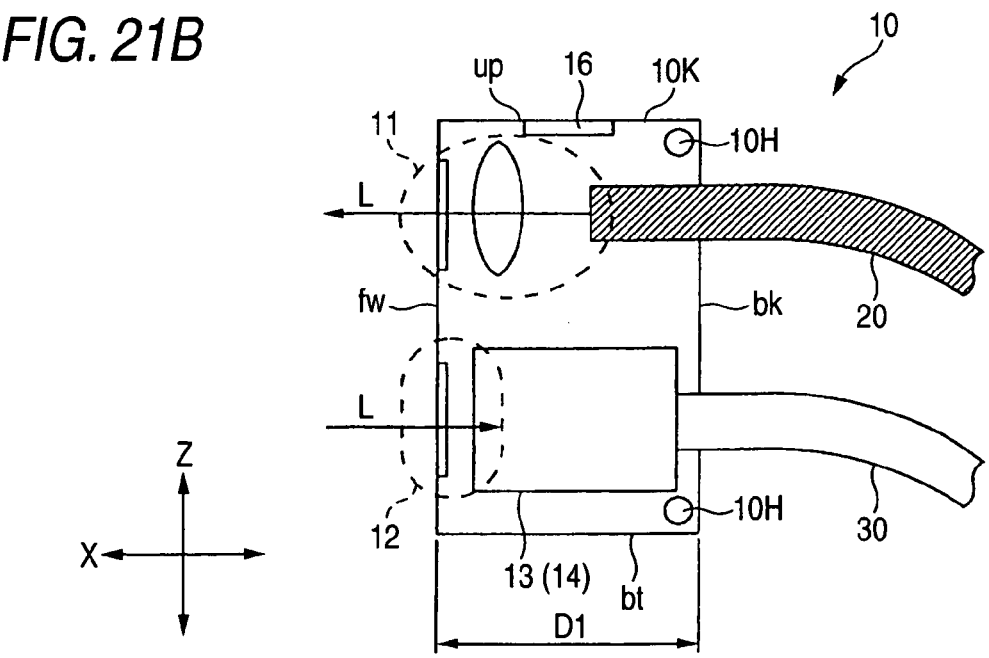

FIGS. 21A and 21B are typical views showing an example of structure of the sensor head portion 10 according to an embodiment of the invention. In FIGS. 21A and 21B, the sensor head portion 10 has a head portion casing 10K.

The head portion casing 10K internally has a light-projecting optical system 11, a light-receiving optical system 12, a light-receiving element 13, a light-receiving circuit 14, an indicator circuit 15, and an indicator lamp 16, as shown in FIG. 2 or 10. The head portion casing 10K is substantially shaped like a rectangular parallelepiped having a top surface up, a bottom surface bt, a front surface fw, a back surface bk, and side surfaces sl and sr.

In the following description, a direction perpendicular both to the front surface fw and to the back surface bk, a direction perpendicular to the side surfaces sl and sr and a direction perpendicular both to the top surface up and to the bottom surface bt are referred to as "X direction", "Y direction" and "Z direction" respectively as represented by arrows X, Y and Z in FIGS. 21A and 21B.

FIG. 21A is a perspective view of the external appearance of the sensor head portion 10. According to FIG. 21A, the light-projecting optical system 11 and the light-receiving optical system 12 are provided in the front surface fw of the sensor head portion 10. An indicator lamp 16 shown in FIG. 11A is provided in the top surface up of the sensor head portion 10.

Two mount holes 10H are formed so as to pierce the opposite side surfaces sl and sr of the sensor head portion 10 in the Y direction. An optical fiber cable 20 and an electric wire cable 30 extend from the back surface bk of the sensor head portion 10.

As described above, light L emitted from the light-projecting optical system 11 is reflected on an object W, so that the reflected light L is made incident on the light-receiving optical system 12.

FIG. 21B shows a sectional structure taken along the line Q—Q in FIG. 21A. As shown in FIG. 21B, the optical fiber cable 20 extends from the back surface bk of the sensor head portion 10. According to FIG. 21B, light led from the main body portion 40 to the senor head portion 10 by the optical fiber cable 20 passes through the light-projecting optical system 11 in the same direction as the axial direction of the optical fiber cable 20 and projects from the front surface fw in the X direction.

As shown in FIG. 21B, the electric wire cable 30 extends 15 from the back surface bk of the sensor head portion 10. According to FIG. 21B, light L from the outside passes through the light-receiving optical system 12 so as to be incident on the light-receiving element 13. As a result, a light-receiving signal S1 (FIGS. 2 and 10) generated by the light-receiving 20 element 13 and amplified by the light-receiving circuit 14 is supplied to the main body portion 40 through the electric wire cable 30.

As described above, in the sensor head portion 10 shown in FIGS. 21A and 21B, the optical fiber cable 20 and the electric wire cable 30 extend in the X direction from the back surface bk. As a result, it is easy to extend both the optical fiber able 20 and the electric wire cable 30 in a predetermined direction. Accordingly, it is easy to install the sensor head portion 10.

In this example, light led from the-main body portion 40 to the sensor head portion 10 by the optical fiber cable 20 can be led from the back surface bk to the light-projecting optical system 11 provided in the front surface fw, without bending of the path of the light. Accordingly, the light-projecting optical system 11 in the sensor head portion 10 can be simplified in structure, so that the dimension between the back surface bk and the front surface fw can be reduced as represented by an arrow D1 in FIG. 21B. As a result, the size of the sensor head portion 10 can be reduced.

In this example, because the indicator lamp 16 is provided in the upper surface up different from the back surface bk from which the optical fiber cable 20 and the electric wire cable 30 extend, indication based on the indication control signal S3 shown in FIG. 10 and transmitted from the main body portion 40 can be prevented from being obstructed by the optical fiber cable 20 and the electric wire cable 30. Accordingly, an operating person can view the indication of the indicator lamp 16 from all directions.

Although the structure of the sensor head portion 10 according to an embodiment of the invention has been described, the sensor head portion 10 may have any one of the following structures.

Figure 22A:
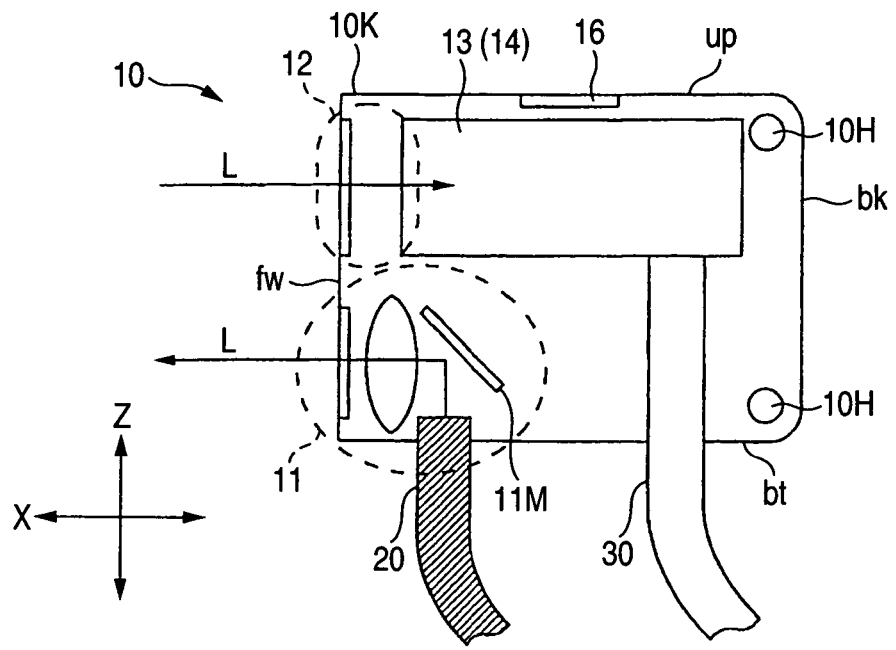
FIGS. 22A and 22B are typical views showing other examples of structure of the sensor head portion according to an embodiment of the invention.
Figure 22B:
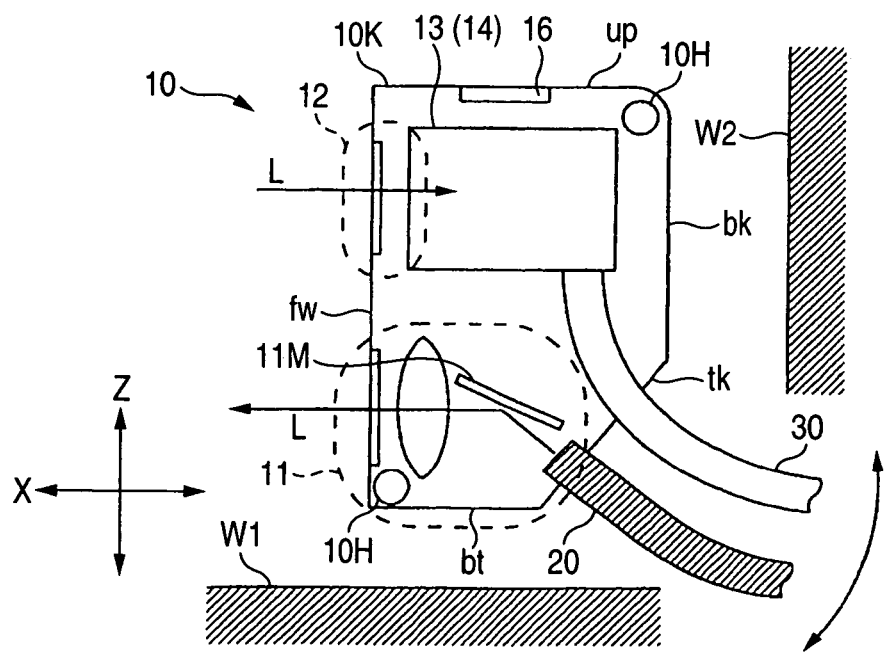

FIGS. 22A and 22B are typical views showing other examples of the structure of the sensor head portion 10 according to an embodiment of the invention.

FIG. 22A is a view showing an example in which the optical fiber cable 20 and the electric wire cable 30 extend from the bottom surface bt of the sensor head portion 10. The difference between the structure of the sensor head portion 10 shown in FIG. 22A and the structure of the sensor head portion 10 shown in FIGS. 21A and 21B is as follows.

According to FIG. 22A, a light-projecting optical system 11 and a light-receiving optical system 12 are provided in the front surface fw of the sensor head portion 10 in the same manner as in the sensor head portion 10 shown in FIGS. 21A and 21B. An indicator lamp 16 shown in FIG. 11A is provided in the top surface up of the sensor head portion 10.

The optical fiber cable 20 extends from the bottom surface bt of the sensor head portion 10. Light led from the main body portion 40 to the sensor head portion 10 by the optical fiber cable 20 is reflected on a reflecting plate 11M provided in the light-projecting optical system 11. The reflected light is output from the front surface fw in the X direction.

The electric wire cable 30 extends from the bottom surface bt of the sensor head portion 10. Thus, the light L output from the light-projecting optical system 11 is reflected on an object W. The reflected light L passes through the light-receiving optical system 12 so as to be incident on the light-receiving element 13. As a result, a light-receiving signal S1 (FIGS. 2 and 10) generated by the light-receiving element 13 and amplified by the light-receiving circuit 14 is supplied to the main body portion 40 through the electric wire cable 30.

As described above, the optical fiber cable 20 and the electric wire cable 30 extend out from the bottom surface bt of the sensor head portion 10. Accordingly, it is easy to extend both the optical fiber cable 20 and the electric wire cable 30 in a predetermined direction. Thus, it is easy to install the sensor head portion 10.

Because the optical fiber cable 20 and the electric wire cable 30 extend out from the bottom surface bt of the sensor head portion 10, it is possible to discriminate the color of the object W located in a direction crossing the direction of extension of the optical fiber cable 20 and the electric wire cable 30.

FIG. 22B is a view showing an example in which the optical fiber cable 20 and the electric wire cable 30 extend from a corner between the bottom surface bt and the back surface bk of the sensor head portion 10. The difference between the structure of the sensor head portion 10 shown in FIG. 22B and the structure of the sensor head portion 10 shown in FIGS. 21A and 21B is as follows.

According to FIG. 22B, a light-projecting optical system 11 and a light-receiving optical system 12 are provided in the front surface fw of the sensor head portion 10 in the same manner as in the sensor head portion 10 shown in FIGS. 21A and 21B. An indicator lamp 16 shown in FIG. 11A is provided in the top surface up of the sensor head portion 10.

An inclined cable leader surface tk is formed in the corner between the bottom surface bt and the back surface bk of the sensor head portion 10. The optical fiber cable 20 and the electric wire cable 30 extend from the cable leader surface tk. Light led from the main body portion 40 to the sensor head portion 10 by the optical fiber cable 20 is reflected on a reflecting plate 11M provided in the light-projecting optical system 11. The reflected light is output from the front surface fw in the X direction.

The light L output from the light-projecting optical system 11 is reflected on an object W. The reflected light L passes through the light-receiving optical system 12 so as to be incident on the light-receiving element 13. As a result, a light-receiving signal S1 (FIGS. 2 and 10) generated by the light-receiving element 13 and amplified by the light-receiving circuit 14 is supplied to the main body-portion 40 through the electric wire cable 30.

Both the optical fiber cable 20 and the electric wire cable 30 have flexibility. Accordingly, it is possible to extend the optical fiber cable 20 and the electric wire cable 30 either to the back surface bk side or to the bottom surface bt side as represented by an arrow in FIG. 22B.

As a result, the bottom surface bt of the sensor head portion 10 can be attached to a predetermined support surface W1 (e.g. horizontal surface) when the optical fiber cable 20 and the electric wire cable 30 are extended while bent on the back surface bk side.

Moreover, the back surface bk of the sensor head portion 10 can be attached to a predetermined support surface W2 (e.g. vertical surface) when the optical fiber cable 20 and the electric wire cable 30 are extended while bent on the bottom surface bt side.

As described above, in accordance with the sensor head portion 10 shown in FIG. 22B, the optical fiber cable 20 and the electric wire cable 30 can be extended either to the back surface bk side or to the bottom surface bt side. Accordingly, the sensor head portion 10 can be attached to any one of various support surfaces easily.

Figure 23:
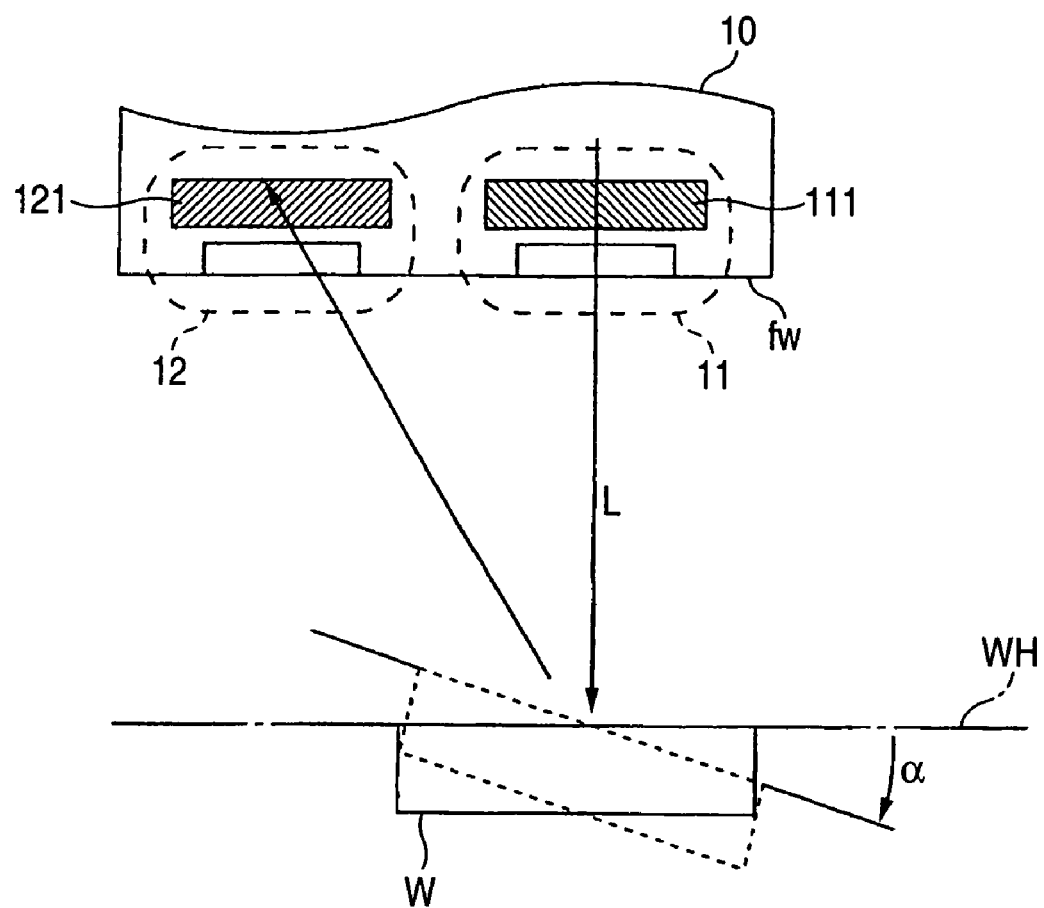
FIG. 23 is a view for explaining the path of light from a light-projecting optical system to a light-receiving optical system in a sensor head portion provided with polarizing plates.

In the sensor head portion 10 according to an embodiment of the invention, the light-projecting optical system 11 and the light-receiving optical system 12 may have polarizing plates respectively. FIG. 23 is a view for explaining the optical path of light from the light-projecting optical system 11 to the light-receiving optical system 12 in the case where the light-projecting optical system 11 and the light-receiving optical system 12 in the sensor head portion 10 have polarizing plates respectively.

As shown in FIG. 23, light L is output vertically from the light-projecting optical system 11 of the sensor head portion 10 according to an embodiment of the invention. As a result, the light L is reflected diffusely and specularly on a surface of an object W. As described above, the light L projected from the light-projecting optical system 11 contains three-color light components based on the light-projecting elements 42*a*, 42*b* and 42*c*.

The ratio of the quantities of received diffuse-reflected light with three colors detected by the light-receiving element 13 varies dependently according to the color of the object W. The ratio of the quantities of received specular-reflected light with three colors detected by the light-receiving element 13 is however constant independent of the color of the object W.

Accordingly, if both the diffuse-reflected light with three colors and the specular-reflected light with three colors are incident on the light-receiving element 13, accuracy in detection of the color of the object W is lowered. It is therefore preferable that the specular-reflected light with three colors incident on the light-receiving element 13 is removed.

As shown in FIG. 23, the sensor head portion 10 is configured so that a first polarizing plate 111 and a second polarizing plate 121 are provided in the light-projecting optical system 11 and the light-receiving optical system 12 respectively to prevent the specular-reflected light L from being incident on the light-receiving element 13.

In FIG. 23, the first polarizing plate 111 transmits polarized light (e.g. P-polarized light) vibrating in a first direction among the light led from the main body portion 40 to the sensor head portion 10 by the optical fiber cable 20. On the other hand, the second polarizing plate 121 transmits polarized light (e.g. S-polarized light) vibrating in a second direction among the light reflected on the object W. The first direction and the second direction are different from each other. In this example, the first direction and the second direction are perpendicular to each other.

In this case, only the polarized light vibrating in the first direction among the light L output from the light-projecting optical system 11 passes through the first polarizing plate 111 so as to be projected onto the object W. Both light specularly reflected on the object W (polarized light vibrating in the first direction) and light diffusely reflected on the object W are received by the light-receiving optical system 12. In the light-receiving optical system 12, the specular-reflected light, that is, the polarized light vibrating in the first direction is cut off by the second polarizing plate 121. Accordingly, only light vibrating in the second direction among the light diffusely reflected on the object W can pass through the light-receiving optical system 12.

As a result, the specular-reflected light can be removed satisfactorily for the light-receiving element 13. Accordingly, the color of the object W can be discriminated accurately.

Incidentally, the first and second directions need not be perpendicular to each other. In this case, since the specular-reflected light is incident on the light-receiving element 13, it is possible to secure the minimum quantity of received light required for the light-receiving element 13 to detect the color of the object W.

EXPERIMENTAL EXAMPLES

The present inventor conducted the following experiment to examine the influence of presence of the first and second polarizing plates 111 and 121 (hereafter collectively referred to as "polarizing plates") and inclination of the object W on the quantity of light incident on the light-receiving element 13 (hereinafter referred to as "total incident light quantity") and the detected color value. Incidentally, the experiment was conducted on two objects W. One of the objects W is assumed to be an object J1 while the other is assumed to be an object J2. A surface of the object J2 is rougher than a surface of the object J1.

First, the inventor disposed the object J1 as shown in FIG. 23. The total-incident light quantity and the detected color value were measured, in accordance with the inclination α of the object J1 with reference to a surface WH perpendicular to light L projected from the light-projecting optical system 11, by a photoelectric sensor 100 provided with polarizing plates and a photoelectric sensor provided without polarizing plates (hereinafter referred to as "photoelectric sensor without polarizing plates").

Incidentally, the inclination α of the object J1 is defined so that an angle in clockwise rotation from the surface WH is regarded as being positive while an angle in counterclockwise rotation from the surface WH is regarded as being negative. In the condition that the inclination of the object J1 was set to be in a range of from −20° to +20°, measurement was made at intervals of 5°. Table 1 shows results of the measurement of the total incident light quantity.

Each of the following measurement results of the total incident light quantity is expressed in a rate based on the case where the inclination of the object J1 is 0°.

TABLE 1

| | Total Incident Light Quantity (rate: %) | |
|---|---|---|
| Angle | Photoelectric Sensor without Polarizing Plates | Photoelectric Sensor with Polarizing Plates |
| −20 | 298% | 103% |
| −15 | 358% | 125% |
| −10 | 256% | 124% |
| −5 | 114% | 102% |
| 0 | 100% | 100% |
| 5 | 89% | 95% |
| 10 | 80% | 88% |
| 15 | 69% | 81% |
| 20 | 65% | 74% |

Table 2 shows measurement results of the detected color value.

TABLE 2

| | Detected Color Value | |
|---|---|---|
| Angle | Photoelectric Sensor without Polarizing Plates | Photoelectric Sensor with Polarizing Plates |
| −20 | 910 | 983 |
| −15 | 922 | 980 |
| −10 | 917 | 969 |
| −5 | 985 | 981 |
| 0 | 993 | 983 |
| 5 | 991 | 981 |
| 10 | 987 | 978 |
| 15 | 981 | 971 |
| 20 | 975 | 963 |

Figure 24A:
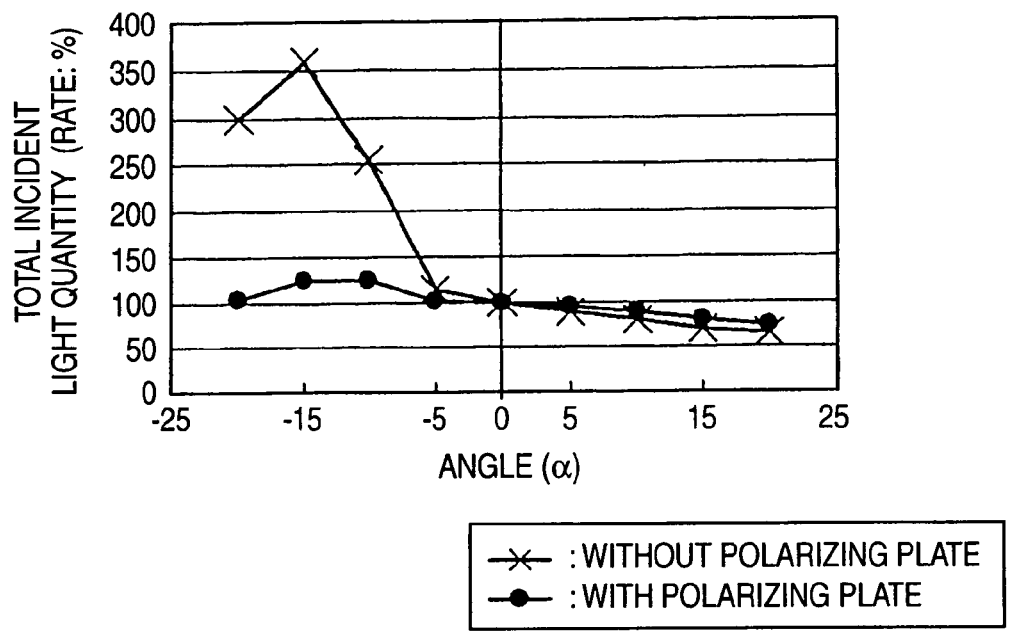
FIG. 24A is a graph showing a result of measurement of the total quantity of incident light measured according to the inclination of the object.
Figure 24B:
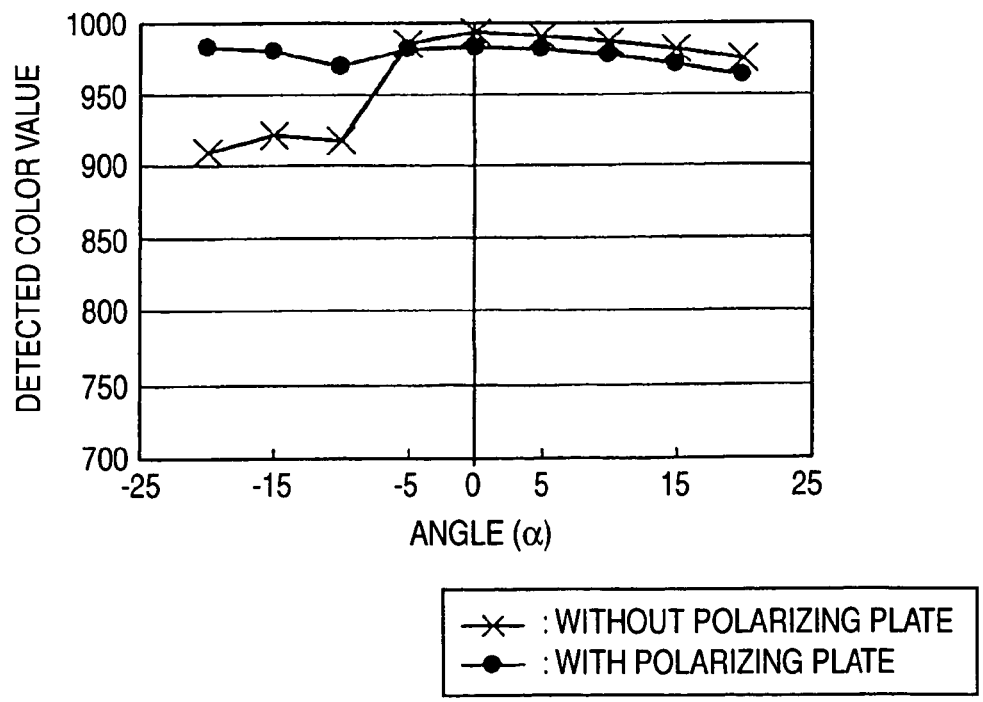
FIG. 24B is a graph showing a result of measurement of the detected color value measured according to the inclination of the object.

Graphs based on the measurement results of the total incident light quantity and the detected color value are shown in FIGS. 24A and 24B. FIGS. 24A and 24B are the graphs showing the measurement results of the total incident light quantity and the color detection value measured in accordance with the inclination of the object J1.

FIG. 24A shows the measurement results of the total incident light quantity measured in accordance with the inclination of the object J1. According to FIG. 24A, the rate of the total incident light quantity measured by the photoelectric sensor without polarizing plates decreases gradually as the inclination α of the object J1 increases in the positive direction. The rate of the total incident light quantity however increases suddenly as the inclination α of the object J1 increases in the negative direction.

On the other hand, the rate of the total incident light quantity measured by the photoelectric sensor 100 with polarizing plates decreases gradually as the inclination α of the object J1 increases in the positive direction. The rate of the total incident light quantity increases gradually as the inclination α of the object J1 increases in the negative direction.

When the photoelectric sensor without polarizing plates and the photoelectric sensor 100 with polarizing plates are compared with each other, the following fact can be found. That is, in the case where the inclination α of the object J1 increases in the positive direction, change in the rate of the total incident light quantity measured by the photoelectric sensor without polarizing plates is similar to that measured by the photoelectric sensor 100 with polarizing plates. On the other hand, in the case where the inclination α of the object J1 increases in the negative direction, the measurement result by the photoelectric sensor without polarizing plates changes largely whereas the measurement result by the photoelectric sensor 100 with polarizing plates does not change largely.

It is conceived that the large change in the measurement result by the photoelectric sensor without polarizing plates is caused by the fact that the quantity of specular-reflected light incident on the light-receiving element 13 increases as the inclination α of the object J1 increases in the negative direction. Accordingly, it is apparent that the photoelectric sensor 100 with polarizing plates can obtain a stable quantity of total incident light regardless of the inclination α of the object W compared with the photoelectric sensor without polarizing plates.

FIG. 24B shows the measurement results of the detected color value measured in accordance with the inclination of the object J1. According to FIG. 24B, the detected color value measured by the photoelectric sensor without polarizing plates little changes when the inclination α of the object J1 increases in the positive direction. The detected color value however decreases suddenly as the inclination α of the object J1 increases in the negative direction.

On the other hand, the detected color value measured by the photoelectric sensor 100 with polarizing plates little changes when the inclination α of the object J1 increases in the positive direction. The detected color value also little changes when the inclination α of the object J1 increases in he negative direction.

When the photoelectric sensor without polarizing plates and the photoelectric sensor 100 with polarizing plates are compared with each other, the following fact can be found. That is, in the case where the inclination α of the object J1 increases in the positive direction, change in the detected color value measured by the photoelectric sensor without polarizing plates is similar to that measured by the photoelectric sensor 100 with polarizing plates. On the other hand, in the case where the inclination α of the object J1 increases in the negative direction, the measurement result by the photoelectric sensor without polarizing plates changes largely whereas the measurement result by the photoelectric sensor 100 with polarizing plates does not change largely.

It is conceived that the large change in the measurement result by the photoelectric sensor without polarizing plates is caused by the fact that the quantity of specular-reflected light incident on the light-receiving element 13 increases as the inclination α of the object J1 increases in the negative direction. Accordingly, it is apparent that the photoelectric sensor 100 with polarizing plates can obtain a stable detected color value regardless of the inclination α of the object W compared with the photoelectric sensor without polarizing plates.

The same experiment as the experiment conducted on the object J1 was conducted on the object J2 by the inventor.

Table 3 shows measurement results of the total incident light quantity.

TABLE 3

| | Total Incident Light Quantity (rate: %) | |
|---|---|---|
| Angle | Photoelectric Sensor without Polarizing Plates | Photoelectric Sensor with Polarizing Plates |
| −20 | 148% | 104% |
| −15 | 152% | 105% |
| −10 | 132% | 105% |
| −5 | 113% | 102% |
| 0 | 100% | 100% |
| 5 | 90% | 94% |
| 10 | 79% | 86% |
| 15 | 69% | 78% |
| 20 | 60% | 70% |

Table 4 shows measurement results of the detected color value.

TABLE 4

| | Detected Color Value | |
|---|---|---|
| Angle | Photoelectric Sensor without Polarizing Plates | Photoelectric Sensor with Polarizing Plates |
| −20 | 923 | 975 |
| −15 | 917 | 972 |
| −10 | 944 | 974 |
| −5 | 977 | 980 |
| 0 | 991 | 982 |
| 5 | 985 | 982 |
| 10 | 981 | 982 |
| 15 | 979 | 978 |
| 20 | 976 | 974 |

Figure 25A:
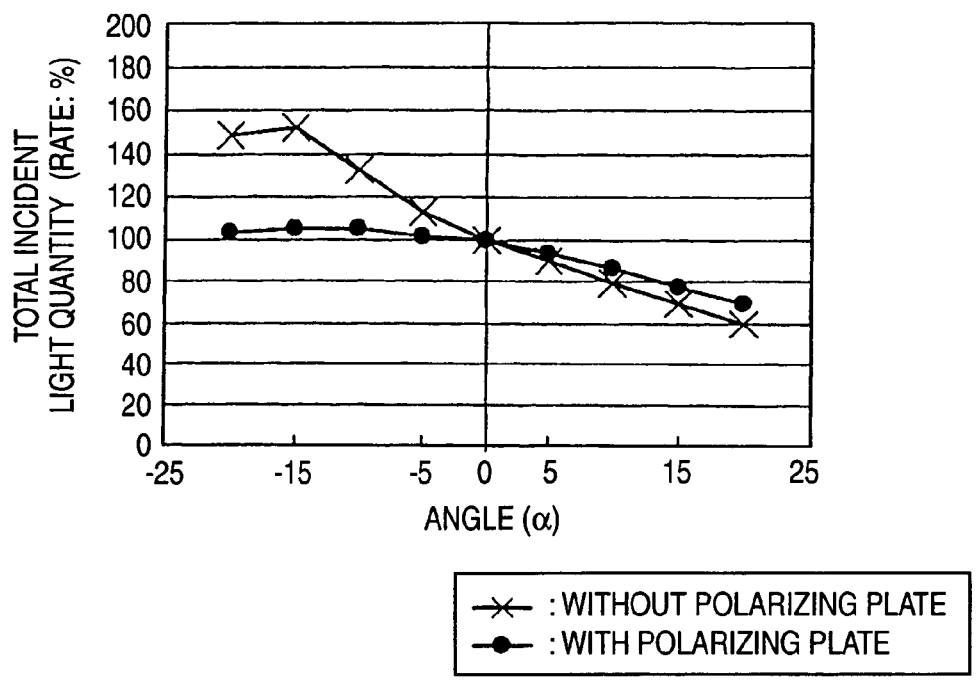
FIG. 25A is a graph showing a result of measurement of the total quantity of incident light measured according to the inclination of the object.
Figure 25B:
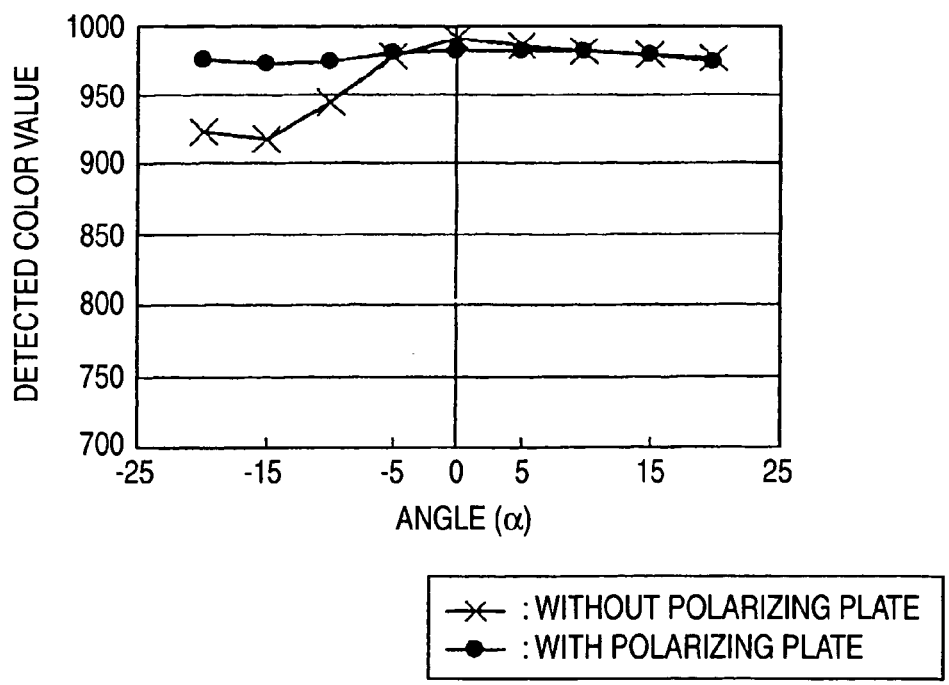
FIG. 25B is a graph showing a result of measurement of the detected color value measured according to the inclination of the object.

Graphs based on the measurement results of the total incident light quantity and the detected color value are shown in FIGS. 25A and 25B. FIGS. 25A and 25B are the graphs showing the measurement results of the total incident light quantity and the detected color value measured in accordance with inclination of the object J2.

FIG. 25A shows the measurement results of the total incident light quantity measured in accordance with the inclination of the object J2. According to FIG. 25A, the rate of the total incident light quantity measured by the photoelectric sensor without polarizing plates decreases gradually as the inclination α of the object J2 increases in the positive direction. The rate of the total incident light quantity however increases suddenly as the inclination α of the object J2 increases in the negative direction.

On the other hand, the rate of the total incident light quantity measured by the photoelectric sensor 100 with polarizing plates decreases gradually as the inclination α of the object J2 increases in the positive direction. The rate of the total incident light quantity increases gradually as the inclination α of the object J2 increases in the negative direction.

When the photoelectric sensor without polarizing plates and the photoelectric sensor 100 with polarizing plates are compared with each other, the following fact can be found. That is, in the case where the inclination α of the object J2 increases in the positive direction, change in the rate of the total incident light quantity measured by the photoelectric sensor without polarizing plates is similar to that measured by the photoelectric sensor 100 with polarizing plates. On the other hand, in the case where the inclination α of the object J2 increases in the negative direction, the measurement result by the photoelectric sensor without polarizing plates changes largely whereas the measurement result by the photoelectric sensor 100 with polarizing plates does not change largely.

It is conceived that the large change in the measurement result by the photoelectric sensor without polarizing plates is caused by the fact that the quantity of specular-reflected light incident on the light-receiving element 13 increases as the inclination α of the object J2 increases in the negative direction. Accordingly, it is apparent that the photoelectric sensor 100 with polarizing plates can obtain a stable total incident light quantity regardless of the inclination α of the object W compared with the photoelectric sensor without polarizing plates.

FIG. 25B shows the measurement results of the detected color value measured in accordance with inclination of the object J2. According to FIG. 25B, the detected color value measured by the photoelectric sensor without polarizing plates little changes when the inclination α of the object J2 increases in the positive direction. The detected color value however decreases suddenly as the inclination α of the object J2 increases in the negative direction.

On the other hand, the detected color value measured by the photoelectric sensor 100 with polarizing plates little changes when the inclination α of the object J2 increases in the positive direction. The detected color value also little changes when the inclination α of the object J2 increases in the negative direction.

When the photoelectric sensor without polarizing plates and the photoelectric sensor 100 with polarizing plates are compared with each other, the following fact can be found. That is, in the case where the inclination α of the object J2 increases in the positive direction, change in the detected color value measured by the photoelectric sensor without polarizing plates is similar to that measured by the photoelectric sensor 100 with polarizing plates. On the other hand, in the case where the inclination α of the object J2 increases in the negative direction, the measurement result by the photoelectric sensor without polarizing plates changes largely whereas the measurement result by the photoelectric sensor 100 with polarizing plates does not change largely.

It is conceived that the large change in the measurement result by the photoelectric sensor without polarizing plates is caused by the fact that the quantity of specular-reflected light incident on the light-receiving element 13 increases as the inclination α of the object J2 increases in the negative direction. Accordingly, it is apparent that the photoelectric sensor 100 with polarizing plates can obtain a stable detected color value regardless of the inclination α of the object W compared with the photoelectric sensor without polarizing plates.

It is apparent from the experimental results on the objects J1 and J2 that the photoelectric sensor 100 with polarizing plates can discriminate the color of the object W stably and accurately regardless of the surface condition of the object W, the inclination of the object W, etc., compared with the photoelectric sensor without polarizing plates.

In the aforementioned first and second embodiments, the light-projecting elements 42a, 42b and 42c are equivalent to a light source, the light-projecting control portion 41 and the signal processing control portion 43 are equivalent to a control portion, the main body portion 40 is equivalent to a main body portion, the light-receiving optical system 11 is equivalent to a light-projecting portion, the light-receiving element 13 is equivalent to a light-receiving element, and the sensor head portion 10 is equivalent to a head portion.

The optical fiber cable 20 is equivalent to an optical fiber cable, the electric wire cable 30 is equivalent to an electric wire cable, the light-projecting elements 42a, 42b and 42c are equivalent to light-projecting elements, and the indicator lamp 16 is equivalent to an indicator portion.

Further, the main body casing 400 is equivalent to a main body casing, the main body side indicator portion 46 is equivalent to a main body indicator portion, the connector C4 of the main body portion 40 is equivalent to a connection portion, the movable member 60 is equivalent to first fixing member, and a combination of the holder member 20H, the packing 20P, the elevating member 90 and the rotary member 80 is equivalent to second fixing member.

In addition, the first polarizing plate 111 is equivalent to first polarizing member, the second polarizing plate 121 is equivalent to second polarizing member, the head portion casing 10K is equivalent to a head portion casing, and the light-receiving optical system 12 is equivalent to a light-receiving portion.

The back surface BK of the main body portion 40 is equivalent to an outer surface, the back surface bk and cable leader surface tk of the sensor head portion 10 are equivalent to a first outer surface, the front surface fw is equivalent to a second outer surface, the back surface bk and bottom surface bt are equivalent to a third outer surface, and the bottom surface bt is equivalent to a fourth outer surface.

The photoelectric sensor according to the invention can be used for detecting the presence of an object in a detection region, the position of the object, the color of the object, etc. by means of projecting light on the detection region and receiving the reflected or transmitted light from the object.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A photoelectric sensor for projecting light on a detection region and receiving said light from said detection region, comprising:
   a main body portion including a light source for generating light, and a control portion for controlling said light source and performing signal processing;
   a head portion provided separately from said main body portion and including a light-projecting portion for projecting light, and a light-receiving element for receiving said light;
   an optical fiber cable through which light generated by said light source of said main body portion is led to said light-projecting portion of said head portion; and
   an electric wire cable through which a signal output from said light-receiving element of said head portion is transmitted to said control portion of said main body portion.

2. A photoelectric sensor according to claim 1, wherein said light source has light-projecting elements for generating light with different wavelengths.

3. A photoelectric sensor according to claim 1, wherein:
   a signal output from said control portion of said main body portion is transmitted to said head portion through said electric wire cable; and
   said head portion further includes an indicator portion for indicating information based on said signal transmitted from said main body portion.

4. A photoelectric sensor according to claim 1, wherein:
   said main body portion further includes a main body casing in which said light source and said control portion are stored and which has outer surfaces; and
   said optical fiber cable and said electric wire cable extend out from a first outer surface included in said outer surfaces of said main body casing.

5. A photoelectric sensor according to claim 4, wherein:
   said main body portion further includes a main body indicator portion for indicating information based on said signal processing executed by said control portion; and
   said main body indicator portion is provided on a second outer surface different from said first outer surface of said main body casing.

6. A photoelectric sensor according to claim 4, wherein said main body portion further includes:
   a connection portion through which said electric wire cable and said control portion are connected to each other; and
   a first fixing member for fixing said electric wire cable to said connection portion.

7. A photoelectric sensor according to claim 6, wherein said main body portion further includes a second fixing member for fixing said optical fiber cable to said main body casing.

8. A photoelectric sensor according to claim 1, wherein said head portion further includes:
   a first polarizing member for polarizing light projected by said light-projecting portion to allow only light polarized in a first direction to pass through said first polarizing member; and
   a second polarizing member for polarizing said light received by said light-receiving element to allow only light polarized in a second direction different from said first direction to pass through said second polarizing member.

9. A photoelectric sensor according to claim 1, wherein:
   said head portion further includes a head portion casing in which said light-projecting portion and said light-receiving element are stored and which has outer surfaces; and
   said optical fiber cable and said electric wire cable extend out from a first outer surface included in said outer surfaces of said head portion casing.

10. A photoelectric sensor according to claim 9, wherein:
    said head portion further includes a light-receiving portion by which light from said detection region is led to said light-receiving element;
    said head portion casing has a second outer surface opposite to said first outer surface; and
    said light-projecting portion and said light-receiving portion are provided on said second outer surface of said head portion casing.

11. A photoelectric sensor according to claim 9, wherein:
    said head portion further includes a light-receiving portion by which light from said detection region is led to said light-receiving element;
    said head portion casing has a second outer surface opposite to said first outer surface and a third outer surface different from said first and second outer surfaces; and said light-projecting portion and said light-receiving portion are provided on said third outer surface of said head portion casing.

12. A photoelectric sensor according to claim 9, wherein:
said head portion further includes a light-receiving portion by which light from said detection region is led to said light-receiving element;
said head portion casing has second and third outer surfaces opposite to each other and a fourth outer surface different from said second and third outer surfaces; and
said light-projecting portion and said light-receiving portion are provided on said second outer surface of said head portion casing; and said first outer surface is provided between said third and fourth outer surfaces so as to be inclined.

13. A photoelectric sensor according to claim 9, wherein:
a signal output from said control portion of said main body portion is transmitted to said head portion through said electric wire cable; and
said head portion further includes an indicator portion for indicating information based on said signal transmitted from said main body portion.

14. A photoelectric sensor according to claim 13, wherein said indicator portion is provided on another outer surface than said first outer surface of said head portion casing.

* * * * *